(12) United States Patent
Chandrasekaran et al.

(10) Patent No.: US 7,937,364 B1
(45) Date of Patent: May 3, 2011

(54) METHOD AND SYSTEM FOR RELIABLE ACCESS OF MESSAGES BY MULTIPLE CONSUMERS

(75) Inventors: Sashikanth Chandrasekaran, Belmont, CA (US); Ashok R. Saxena, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 09/265,489

(22) Filed: Mar. 9, 1999

(51) Int. Cl.
*G06F 17/30* (2006.01)

(52) U.S. Cl. ........ 707/636; 707/609; 707/918; 707/613; 707/643

(58) Field of Classification Search .................. 707/1, 2, 707/10, 3, 7, 100, 102; 705/1, 9, 23
See application file for complete search history.

(56) References Cited

U.S. PATENT DOCUMENTS

| | | | |
|---|---|---|---|
| 4,868,866 A * | 9/1989 | Williams, Jr. ......................... 1/1 |
| 4,965,716 A | 10/1990 | Sweeney |
| 5,428,766 A * | 6/1995 | Seaman ........................ 395/575 |
| 5,551,035 A | 8/1996 | Arnold et al. |
| 5,631,635 A * | 5/1997 | Robertson et al. ............ 340/7.21 |
| 5,666,502 A * | 9/1997 | Capps ............................ 345/352 |
| 5,706,516 A | 1/1998 | Chang et al. |
| 5,729,540 A | 3/1998 | Wegrzyn |
| 5,745,703 A | 4/1998 | Cejtin et al. |
| 5,790,804 A | 8/1998 | Osborne |
| 5,848,234 A | 12/1998 | Chernick et al. |
| 5,870,761 A | 2/1999 | Demers et al. |
| 5,873,086 A | 2/1999 | Fujii et al. |
| 6,018,717 A * | 1/2000 | Le et al. .......................... 705/13 |
| 6,058,389 A * | 5/2000 | Chandra et al. .................... 707/1 |
| 6,157,706 A * | 12/2000 | Rachelson |
| 6,189,103 B1 * | 2/2001 | Nevarez et al. ................ 713/201 |
| 6,216,110 B1 * | 4/2001 | Silverberg ......................... 705/9 |
| 6,282,564 B1 * | 8/2001 | Smith et al. ................... 709/206 |
| 6,351,745 B1 * | 2/2002 | Itakura et al. .................... 707/10 |
| 6,363,388 B1 * | 3/2002 | Sprenger et al. ................ 707/10 |
| 6,442,600 B1 * | 8/2002 | Anderson ...................... 709/217 |

OTHER PUBLICATIONS

Lonnie E. Moseley, Microsoft Office 97 1997, Sybex Inc., Second Edition, pp. 757.*

* cited by examiner

*Primary Examiner* — Baoquoc To
(74) *Attorney, Agent, or Firm* — Vista IP Law Group, LLP.

(57) ABSTRACT

Systems and methods for managing the processing of the same pieces of information, e.g., messages, by multiple consumers, in a prescribed order, without causing the degradation of any consumer's performance because of other consumers' access to the same information. A single information queue contains pieces of information to be accessed by multiple consumers. Each piece of information is stored in the information queue along with an information identifier that uniquely identifies the piece of information. A separate table is used to keep track of and identify the pieces of information in the information queue that have been accessed by respective consumers. This separate table is decoupled from the information queue, and, thus, each consumer's access of a piece of queued information does not impact any other consumer's access of the same piece of information. A deletion process may also be executed, in the background if desired, which uses a working list table that identifies the pieces of information that have been accessed. With the working list table and the separate table, the deletion process identifies the pieces of information that have been accessed by all the respective consumers, and deletes them from the information queue.

40 Claims, 19 Drawing Sheets

| MESSAGE | MESSAGE ID | MESSAGE PROPERTIES |
|---|---|---|
| | | |

FIG. 3A-1

| MESSAGE ID | CONSUMER ID | MESSAGE STATE | HISTORY LOG |
|---|---|---|---|
| | | | |

FIG. 3A-2

| MESSAGE | MESSAGE ID | MESSAGE PROPERTIES |
|---|---|---|
| ~ | MSG_X | ~ |
| | | |

FIG. 3B-1

| MESSAGE ID | CONSUMER ID | MESSAGE STATE | HISTORY LOG |
|---|---|---|---|
| MSG_X | A | ENQUEUED | ~ |
| MSG_X | B | ENQUEUED | ~ |
| MSG_X | C | ENQUEUED | ~ |

FIG. 3B-2

| MESSAGE | MESSAGE ID | MESSAGE PROPERTIES |
|---|---|---|
| ~ | MSG_X | ~ |

FIG. 3C-1

| MESSAGE ID | CONSUMER ID | MESSAGE STATE | HISTORY LOG |
|---|---|---|---|
| MSG_X | A | ENQUEUED | ~ |
| MSG_X | B | READ | ~ |
| MSG_X | C | ENQUEUED | ~ |

| MESSAGE | MESSAGE ID | MESSAGE PROPERTIES |
|---|---|---|
| ~ | MSG_X | ~ |
| ~ | MSG_Y | ~ |

| MESSAGE ID | CONSUMER ID | ENQUEUE TIME |
|---|---|---|
| MSG_X | A | 8:05 |
| MSG_X | B | 8:05 |
| MSG_Y | A | 9:10 |
| MSG_Y | B | 9:10 |
| MSG_Y | C | 9:10 |
| MSG_Y | D | 9:10 |

| MESSAGE ID | CONSUMER ID | MESSAGE STATE | HISTORY LOG |
|---|---|---|---|
| MSG_X | A | ENQUEUED | ~ |
| MSG_X | B | ENQUEUED | ~ |
| MSG_Y | A | ENQUEUED | ~ |
| MSG_Y | B | ENQUEUED | ~ |
| MSG_Y | C | ENQUEUED | ~ |
| MSG_Y | D | ENQUEUED | ~ |

| MESSAGE | MESSAGE ID | MESSAGE PROPERTIES |
|---|---|---|
| ~ | MSG_X | ~ |
| ~ | MSG_Y | ~ |

| MESSAGE ID | CONSUMER ID | ENQUEUE TIME |
|---|---|---|
| MSG_X | A | 8:05 |
| MSG_Y | A | 9:10 |
| MSG_Y | B | 9:10 |
| MSG_Y | C | 9:10 |
| MSG_Y | D | 9:10 |

| MESSAGE ID | CONSUMER ID | MESSAGE STATE | HISTORY LOG |
|---|---|---|---|
| MSG_X | A | ENQUEUED | ~ |
| MSG_X | B | READ | ~ |
| MSG_Y | A | ENQUEUED | ~ |
| MSG_Y | B | ENQUEUED | ~ |
| MSG_Y | C | ENQUEUED | ~ |
| MSG_Y | D | ENQUEUED | ~ |

| MESSAGE | MESSAGE ID | MESSAGE PROPERTIES |
|---|---|---|
| ~ | MSG_X | ~ |
| ~ | MSG_Y | ~ |
| ~ | MSG_Z | ~ |

| MESSAGE ID | CONSUMER ID | ENQUEUE TIME | PRIORITY |
|---|---|---|---|
| MSG_X | A | 8:05 | 2 |
| MSG_X | B | 8:05 | 2 |
| MSG_Y | A | 8:30 | 1 |
| MSG_Y | B | 8:30 | 1 |
| MSG_Z | A | 9:00 | 1 |

| MESSAGE ID | CONSUMER ID | MESSAGE STATE | HISTORY LOG |
|---|---|---|---|
| MSG_X | A | ENQUEUED | ~ |
| MSG_X | B | ENQUEUED | ~ |
| MSG_Y | A | ENQUEUED | ~ |
| MSG_Y | B | ENQUEUED | ~ |
| MSG_Z | A | ENQUEUED | ~ |

| MESSAGE | MESSAGE ID | MESSAGE PROPERTIES |
|---|---|---|
| ~ | MSG_X | ~ |
| ~ | MSG_Y | ~ |
| ~ | MSG_Z | ~ |

| MESSAGE ID | CONSUMER ID | ENQUEUE TIME | PRIORITY |
|---|---|---|---|
| MSG_X | A | 8:05 | 2 |
| MSG_X | B | 8:05 | 2 |
| MSG_Y | B | 8:30 | 1 |
| MSG_Z | A | 9:00 | 1 |

| MESSAGE ID | CONSUMER ID | MESSAGE STATE | HISTORY LOG |
|---|---|---|---|
| MSG_X | A | ENQUEUED | ~ |
| MSG_X | B | ENQUEUED | ~ |
| MSG_Y | A | READ | ~ |
| MSG_Y | B | ENQUEUED | ~ |
| MSG_Z | A | ENQUEUED | ~ |

882

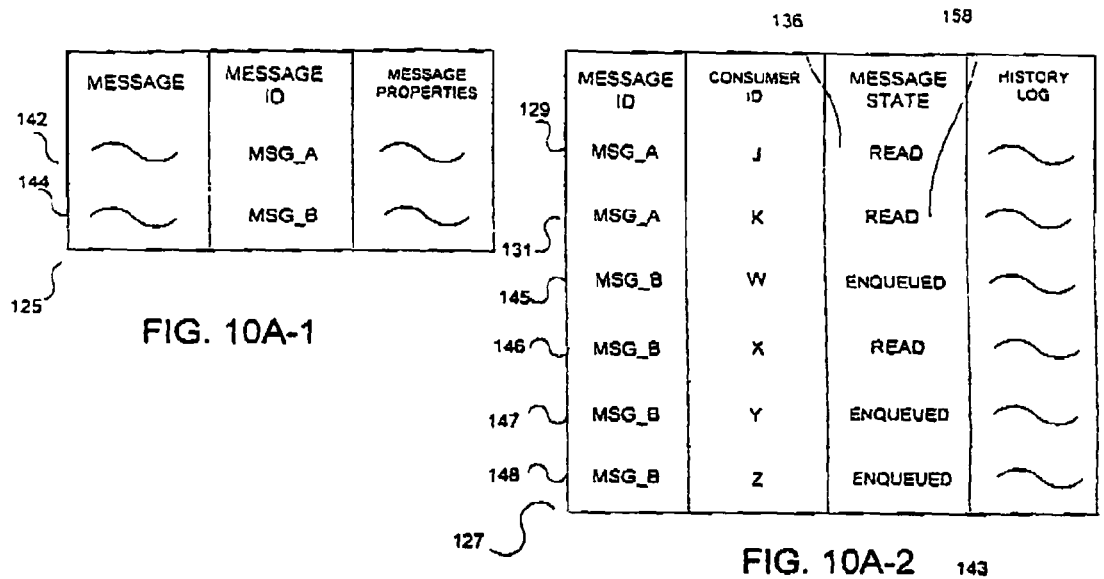
FIG. 10A-1
FIG. 10A-2
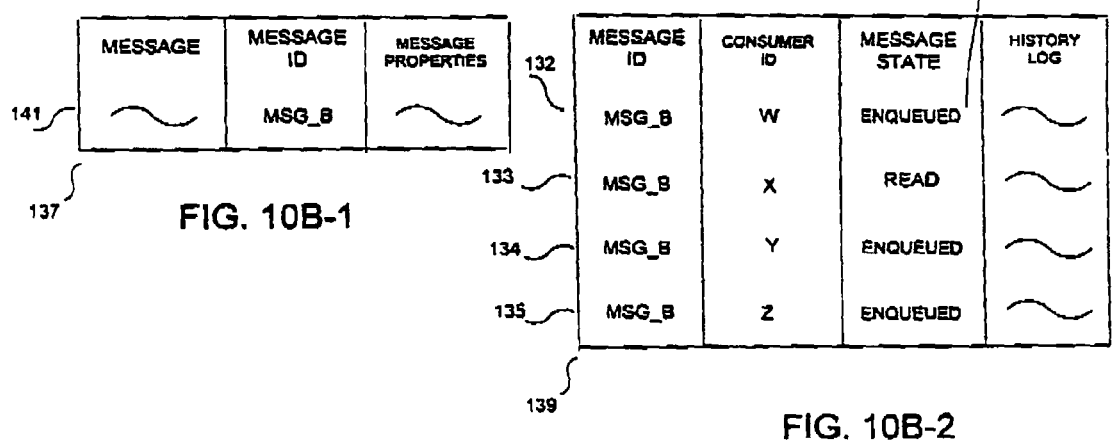
FIG. 10B-1
FIG. 10B-2

FIG. 13A-1

| MESSAGE | MESSAGE ID | MESSAGE PROPERTIES |
|---|---|---|
| ~ | MSG_X | ~ |
| ~ | MSG_Y | ~ |

FIG. 13A-3

| MESSAGE ID |
|---|

FIG. 13A-2

| MESSAGE ID | CONSUMER ID | MESSAGE STATE | HISTORY LOG |
|---|---|---|---|
| MSG_X | A | ENQUEUED | ~ |
| MSG_X | B | ENQUEUED | ~ |
| MSG_Y | A | ENQUEUED | ~ |
| MSG_Y | B | ENQUEUED | ~ |
| MSG_Y | C | ENQUEUED | ~ |
| MSG_Y | D | ENQUEUED | ~ |

FIG. 13B-1

| MESSAGE | MESSAGE ID | MESSAGE PROPERTIES |
|---|---|---|
| ~ | MSG_X | ~ |
| ~ | MSG_Y | ~ |

FIG. 13B-3

| MESSAGE ID |
|---|
| MSG_X |

FIG. 13B-2

| MESSAGE ID | CONSUMER ID | MESSAGE STATE | HISTORY LOG |
|---|---|---|---|
| MSG_X | A | ENQUEUED | ~ |
| MSG_X | B | READ | ~ |
| MSG_Y | A | ENQUEUED | ~ |
| MSG_Y | B | ENQUEUED | ~ |
| MSG_Y | C | ENQUEUED | ~ |
| MSG_Y | D | ENQUEUED | ~ |

FIG. 15D-1

| MESSAGE | MESSAGE ID | MESSAGE PROPERTIES |
|---|---|---|
| ~ | MSG_Z | ~ |

| MESSAGE ID | CONSUMER ID | MESSAGE STATE | HISTORY LOG |
|---|---|---|---|
| MSG_Z | A | READ | ~ |
| MSG_Z | B | ENQUEUED | ~ |
| MSG_Z | C | READ | ~ |
| MSG_Z | D | READ | ~ |

| MESSAGE ID |
|---|
| MSG_X |
| MSG_Z |

| MESSAGE | MESSAGE ID | MESSAGE PROPERTIES |
|---|---|---|
| ~ | MSG_Z | ~ |

| MESSAGE ID | CONSUMER ID | MESSAGE STATE | HISTORY LOG |
|---|---|---|---|
| MSG_Z | A | READ | ~ |
| MSG_Z | B | ENQUEUED | ~ |
| MSG_Z | C | READ | ~ |
| MSG_Z | D | READ | ~ |

| MESSAGE ID |
|---|
| MSG_Z |

| MESSAGE | MESSAGE ID | MESSAGE PROPERTIES |
|---|---|---|
| ~ | MSG_Z | ~ |

| MESSAGE ID | CONSUMER ID | MESSAGE STATE | HISTORY LOG |
|---|---|---|---|
| MSG_Z | A | READ | ~ |
| MSG_Z | B | ENQUEUED | ~ |
| MSG_Z | C | READ | ~ |
| MSG_Z | D | READ | ~ |

| MESSAGE ID |
|---|

METHOD AND SYSTEM FOR RELIABLE ACCESS OF MESSAGES BY MULTIPLE CONSUMERS

FIELD OF THE INVENTION

The present invention pertains to the field of computer information systems, including, more particularly, information systems for managing delivery of information to multiple consumers.

BACKGROUND OF THE INVENTION

In many application scenarios, one or more applications produce messages that are intended to be processed exactly once by multiple consumers, including other applications or users. Each such message is deemed processed if, and only if, all of the consumers have processed the message. Further, each consumer must process the message in exactly the same order that is determined by the application, for example, on a first in-first out basis, or on a prescribed priority basis.

One approach for managing the delivery of messages to multiple consumers is to provide a separate message queue for each consumer. When a message is to be enqueued, or otherwise stored in a queue for subsequent use by one or more consumers, for each consumer that is to read the message, the message is added to that consumer's individual message queue.

When a message is to be dequeued, or otherwise read by a consumer, the message is returned to the consumer from the consumer's respective message queue. The message is then deleted from the consumer's message queue, and the dequeueing process is ended.

In this method, each consumer has its own individual message queue. Thus, a first consumer has a first message queue, a second consumer has a second message queue, and so on.

While this approach creates no concurrency problems, as each consumer accesses its own individual message queue to read the messages destined for it, there are design features that make this method generally unfavorable. First, this method requires considerable amounts of memory, for each message must be replicated at least as many times as there are consumers to read it. As a portion of messages in any system can be expected to be relatively large, the demands on memory imposed by this method may be difficult or even unmanageable for many systems.

In addition, this method requires complexity in message management, due to the replication of a single message for use by many different consumers. If, after a message is enqueued to the various consumer message queues, it is to be modified, altered, or otherwise acted on in any way, the system will have to replicate the change as many times as there are instances of the message. With many consumers, this maintenance chore can be expected to adversely impact the overall system performance.

Another approach for managing the delivery of messages to multiple consumers is to use one message queue for all the consumers, but lock each message queue entry that is currently being accessed. In this way, when a first consumer accesses a particular message in the message queue, no other consumer can access the message until the first consumer has completed its transaction and unlocked the message queue entry.

In this method, a reference count is used to keep track of when a message in the queue has been read by all the consumers and can be deleted from the message queue. The reference count may be a field in the message queue, or it may be a variable in a separate table, array or list. When a message is enqueued to the message queue, a corresponding reference count for that message is set to the maximum number of consumers that are to read the message. Thereafter, each time a consumer reads the message, the associated reference count is decremented. When the reference count becomes equal to zero, it is assumed that all consumers that need to access the message have done so, and the message is deleted from the message queue.

While this method resolves the problem of the large memory usage posed by the previously described method, by using generally one copy of a message for all consumers, it creates concurrency problems between the consumers. As all consumers must process the messages in the message queue in the same order, the messages in the message queue become hotspots, with one or more consumers possibly queued behind a first consumer who has gained access to a first message. This can significantly affect access time to the messages by other consumers. Depending on various system and environmental factors, such as the number of consumers accessing a message, the time required to complete a transaction involving a read on the message, and a consumer's relative position waiting to access the message in the queue, consumers may encounter significant delays to access one or more of the queued messages.

Yet another method for handling the delivery of messages to multiple consumers is to enqueue a message to a single message queue that all relevant consumers can access, and store an associated reference count in the queue for use in subsequently deleting the message from the queue. The global message queue has a field of message entries, for storing each of the enqueued messages. The global message queue also has a second field, associated with the field of message entries, that contains a reference count for each of the enqueued messages. When a message is added to the queue, the associated reference count is set to the maximum number of consumers who are to read it.

In this method, unlike the approach described immediately above, a message queue entry is not locked when a user reads the respective message in the queue. Instead, at some point during the transaction in which a consumer reads a message, the reference count associated with the message is decremented. A deletion process determines if the reference count for any particular enqueued message is set to zero. If the reference count associated with an enqueued message is zero, it is assumed that all consumers that are to read the associated message have read it; the message is then deleted from the queue. If, however, the associated reference count for an enqueued message is not equal to zero, indicating that not all consumers that are to read the message have, the message is not deleted from the message queue.

This method has the memory-savings advantage that generally only one copy of a message is enqueued and used by all the consumers that are to read it. However, this method does not resolve concurrency problems between consumers accessing the same message at relatively the same time. While this method does not require an enqueued message to be locked when a consumer reads it from the queue, the reference count in the queue associated with the message is locked when it is updated, i.e., decremented, and when it is referenced during the deletion processing. Thus, the reference count field becomes a hotspot. The ultimate effect is that all but a first consumer must wait for the first consumer that has accessed a reference count to complete its transaction before they can perform theirs. The transaction that consumes a particular enqueued message can take an arbitrary amount of time to complete, taking into consideration commit or rollback scenarios involving the message processing. As the reference count associated with the particular enqueued message must remain locked until the transaction is completed, it can remain locked for an arbitrary amount of time, negatively impacting other consumers' processing and overall system performance.

Still another approach involves the storage of messages in a single queue, in which message sequence numbers and low water marks are used to manage the access of enqueued messages by multiple consumers. According to this method, when a new message is added to the message queue, it is logically associated with a monotonically increasing sequence number. Each consumer is associated with a low water mark value which indicates the next message in the queue the consumer is to read. Thus, implicitly, a consumer's low water mark value indicates all the enqueued messages a consumer has already read, as the enqueued messages are stored in monotonically increasing order in the message queue.

When a consumer reads an enqueued message, the message in the queue with the sequence number corresponding to the consumer's current low water mark value is accessed. The consumer's low water mark value is then incremented. If, however, the consumer's low water mark value is greater than the maximum message sequence number, there are no enqueued messages for the consumer to read.

In this approach, when a deletion process is activated, the lowest low water mark value for all the consumers is identified. The deletion process then deletes all the messages in the queue with associated sequence numbers that are less than the identified lowest low water mark value.

An advantage of this method is that it reduces the memory usage required to provide one message to many consumers, as generally one copy of a message is read by all the respective consumers. Moreover, the concurrency problems associated with other methods do not exist with this method as there is no need to write to, and, thus, lock a portion of, the message queue during a consumer's read message transaction. However, this method has other serious limitations that circumscribe its scope of applicability.

First, with this method, messages cannot be prioritized; they must be processed on a first in-first out basis. This is because the sequence numbers associated with enqueued messages must be in sequential order for the associated read message and deletion processing to operate correctly. Another drawback is that each consumer that accesses the message queue, even those that access the message queue only once, must be provided an associated low water mark value. Thereafter, that consumer's low water mark values must be maintained forever, to allow effective deletion processing. As the number of consumers accessing the message queue increases, the number of low water mark values to be maintained and to be accessed by the deletion process increases correspondingly. Conceptually, the number of consumers who ever access the message queue can grow infinitely large. Thus, the processing associated with this method can likely become unduly complex, maintaining and managing a very large number of low water mark values.

Thus, it is desirable to have a reliable message delivery system and process that ensures that the same messages can be viewed by multiple consumers, in a prescribed order, without causing degradation of any consumer's processing performance because of other consumers' access to the same message(s). Too, it is desirable to have a reliable message delivery system that requires a minimum amount of memory to maintain. Further, it is desirable for the message delivery system to handle message queue deletions in an optimum manner.

SUMMARY OF THE INVENTION

The invention comprises systems and methods for ensuring that the same messages, or more generally, pieces of information, or data, can be accessed by multiple consumers, in a prescribed order, without resulting in the degradation of any consumer's processing performance because of other consumers' access to the same message(s), or information or data.

In an embodiment, a single information queue holds one or more pieces of information, each piece of information to be read, or otherwise accessed, by one or more consumers. Each piece of information is stored, or queued, in a record in the information queue. A unique information identifier identifies each separate queued piece of information.

In an embodiment, a separate table is used to keep track of and identify the pieces of information in the information queue that are to be accessed by the various consumers. In an embodiment, this separate table contains a record for each piece of information/consumer pair; i.e., the separate table contains a record for each consumer, for each queued piece of information the consumer is to access. The unique information identifier that identifies each separate piece of information in the information queue also identifies the same piece of information for corresponding records in this separate table. An advantage of the present invention is that this separate table is decoupled from the information queue, and thus, each consumer's access of a piece of queued information does not impact any other consumer's access of the same piece of information.

According to one aspect of the invention, when a consumer accesses a piece of information in the information queue, the information is returned to the consumer, and the record for the piece of information/consumer pair in the separate table is updated to indicate the respective consumer's access.

According to another aspect of the invention, the deletion of pieces of information from the information queue is executed in the background, without affecting consumers' processing of the information queue. In an embodiment, queued pieces of information are deleted, or otherwise removed, from the information queue when all consumers that are to access the information have completed their access. In an embodiment, the records in the separate table are used in determining the queued pieces of information to delete.

In another embodiment, a separate work list table is used in processing the deletion of pieces of information from the information queue. According to one aspect of the invention, when a consumer accesses a queued piece of information, an entry is generated in the work list table. Each work list table entry identifies the queued piece of information that was accessed by its unique information identifier. Entries in the work list table are then accessed by a process for deleting queued pieces of information, e.g., a deletion process.

The deletion process uses the work list table entries to determine the records in the separate table to review, to thereby identify the pieces of information that have been accessed by all appropriate consumers. In an embodiment, each record in the separate table with the unique information identifier that is in a corresponding work list table entry is reviewed by the deletion process. The deletion process using a work list table improves system performance, as only those records in the separate table for pieces of information that have been accessed by a consumer are reviewed.

According to one aspect of the invention, the work list table is implemented on a first-in, first-out basis. According to another aspect of the invention, the work list table is implemented using an index ordered by the time a respective piece of information is to be deleted from the information queue.

Other and further objects, features, aspects and advantages of the present invention are found in the detailed description of the preferred embodiments and the accompanying drawings.

BRIEF DESCRIPTION OF THE ACCOMPANYING DRAWINGS

FIGS. 3A, 3B and 3C depict illustrative examples of an embodiment of the results of an enqueue process flow.

FIGS. 7A and 7B depict illustrative examples of an embodiment of the results of a read transaction process flow using a read-order table with an enqueue time field.

FIGS. 8A and 8B depict illustrative examples of an embodiment of the results of a read transaction process flow using a read-order table with an enqueue time field and a priority field.

FIGS. 10A and 10B depict illustrative examples of an embodiment of the results of a garbage collection process flow.

FIGS. 13A and 13B depict illustrative examples of an embodiment of the results of a read transaction process flow using a work list table.

DETAILED DESCRIPTION OF THE PREFERRED EMBODIMENTS

In the following description, for purposes of explanation, numerous specific details are set forth in order to provide a thorough understanding of the present invention. It will be apparent, however, to one skilled in the art, that the present invention may be practiced without these specific details. In other instances, well-known structures and devices are shown in block diagram form in order to avoid unnecessarily obscuring the present invention.

Delivery of Messages to Multiple Consumers without Hotspots

The present invention is directed to an information or data delivery system for reliable access of messages by multiple consumers. According to an embodiment, a queue of information (information queue) is created to hold information that is to be accessed by, or delivered to, multiple consumers. As used herein, the term "consumer" refers to any entity, structure or object that may access the information, including users or applications.

Additionally, a history queue, or table, is also created. The history table can be separate and decoupled from the information queue. The history table provides logical reference counts for consumer processing (e.g., reading, or dequeuing) of the enqueued information, as well as facilitating subsequent deletion, or garbage collection, processing of information already processed by all consumers.

In general, the method and system described herein can be used for any information or data delivery system. For purposes of illustration only, and not by way of limitation, the remainder of the details of the method and system are described in the context of a message delivery system.

According to an embodiment, the history table comprises separate entries for each consumer, for each enqueued message, i.e., for each enqueued message/consumer pair. Thus, there are no contention points, or hotspots, as consumers do not share history table entries for message processing and/or message deletion purposes. In this embodiment, all consumers that are to read, or more generally, access, an enqueued message read the same message in the message queue. However, each consumer indicates that it has read the message in its individual respective entry in the history table. Thus, in a system in which consumers must access one or more enqueued messages in the same prescribed order, no consumer has to wait for any other to finish a transaction, before they can begin one on the same message.

Figure 1A:
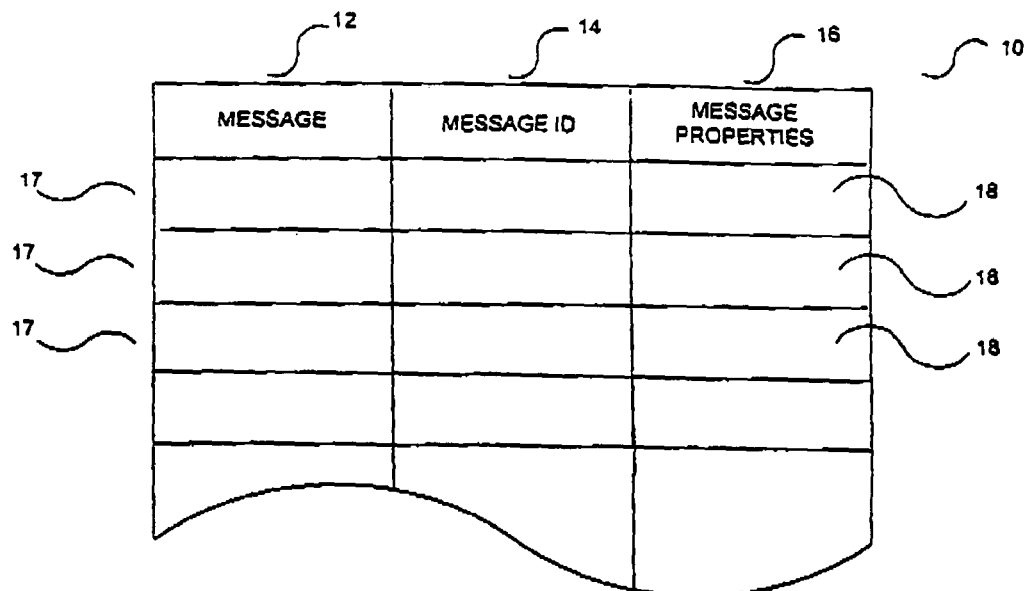
FIG. 1A is an embodiment of a message queue.
Figure 1B:
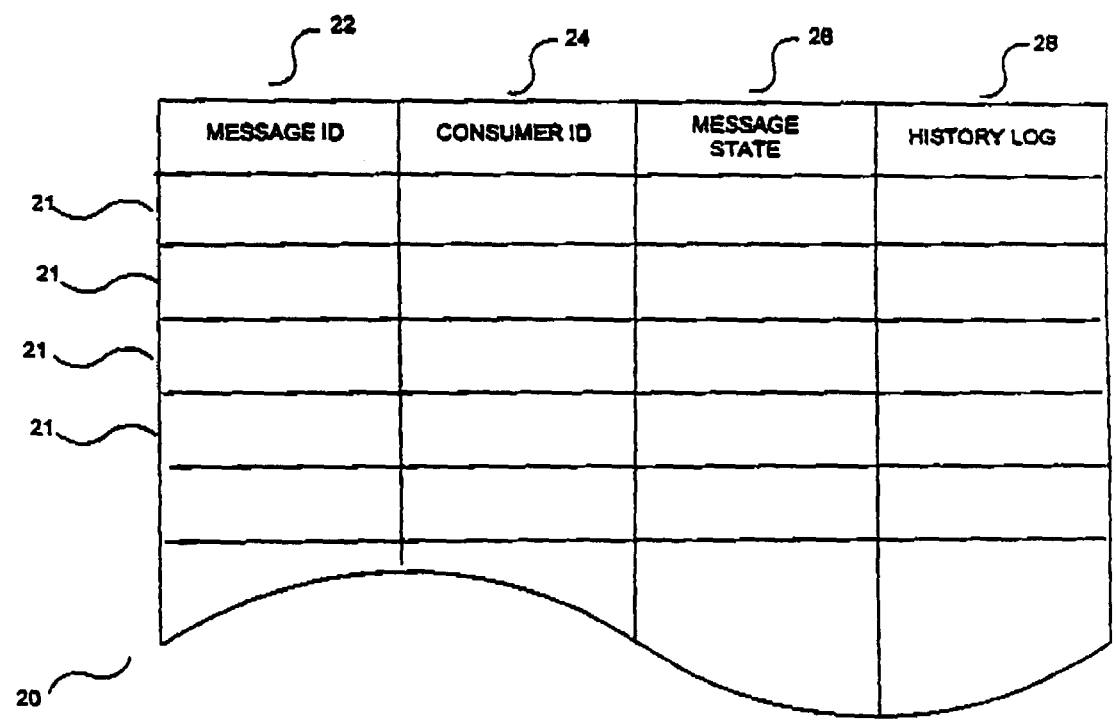
FIG. 1B is an embodiment of a history table.

Referring to FIGS. 1A and 1B, an embodiment of a global message queue 10 and a global history table 20 are shown, for handling message delivery to multiple consumers. In FIG. 1A, a message queue 10 comprises message queue records 17, one for each enqueued message. Each message queue record 17 comprises a message field 12 and a message id field 14. In an embodiment, a message queue record 17 further comprises a message properties field 16.

The message field 12 of a message queue record 17 comprises the respective enqueued message to be accessed by one or more consumers. The message id field 14 comprises a unique identification, i.e., message id, for the corresponding enqueued message in the respective message field 12. The message properties field 16 generally comprises transactional information relevant to the corresponding enqueued message. In an embodiment, the message properties field 16 for each message queue record 17 comprises an array of transactional information. In an embodiment, a message properties field entry 18 includes, but is not limited to, the time that the corresponding message was enqueued.

As shown in FIG. 1B, a history table 20 comprises a history table record 21 for each consumer that is to read each enqueued message, i.e. each enqueued message/consumer pair. When a message is enqueued to the message queue 10, a history table record 21 is generated in the history table 20 for each consumer that is to read, or more generally, access, the message.

Each history table record 21 comprises a message id field 22, a consumer id field 24 and a message state field 26. In an embodiment, a history table record 21 further comprises a history log field 28. The message id field 22 of a history table record 21 comprises an enqueued message's message id. The message id in a message queue record 17 is the same message id used in the corresponding history table record(s) 21 for the respective enqueued message. In an embodiment, the history table records 21 are indexed by the message id field 22.

As noted, a history table record 21 is added to the history table 20 for each consumer that is to access an enqueued message. An identification of a consumer that is to access the message identified by the message id in the message id field 22 of a history table record 21 is stored in the corresponding consumer id field 24.

The message state field 26 of a history table record 21 generally indicates whether or not the message identified in the respective message id field 22 has been accessed by the consumer identified in the respective consumer id field 24. The message state field 26 of the history table records 21 is used by the deletion, or garbage collection, process in determining which messages in the message queue 10 can be deleted, as further explained below. In an embodiment, the message state field 26 of the history table records 21 is also used by the consumers to determine whether they have read a particular enqueued message.

In an embodiment, a history table record 21 further comprises a history log field 28. In an embodiment, a history log field 28 comprises information useful for the processing of an enqueued message, including, but not limited to, entries for the name of the consumer identified in the respective consumer id field 24, the read time, i.e., the time the respective consumer processed the respective message, and state information on the consumer's processing of the message. In an embodiment, the state information includes, but is not limited to, an indication of whether errors were encountered in processing the respective message, the number of retries attempted by the consumer to process the message, and an indication of whether the consumer's message processing was successful or not.

In an embodiment, a history table can use prefix index key compression to store only one instance of the message id for all the consumers that are to access the message. Using key compression, the storage, or memory, structures for both the message queue and the history table consume approximately the same space as used in a method where the history information is stored along with the message in the message queue itself. Thus, hotspots can be eliminated without increasing required storage.

Figure 2:
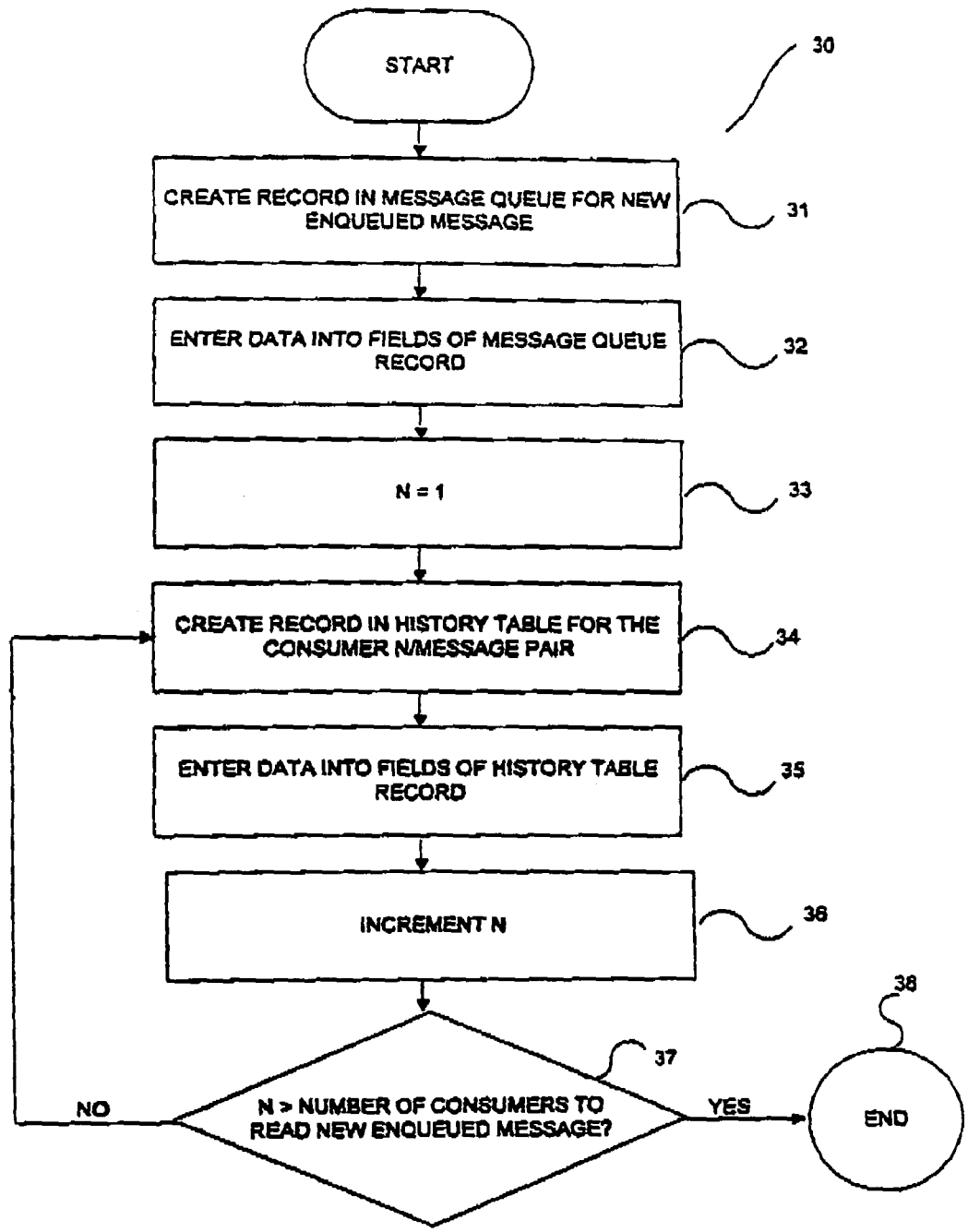
FIG. 2 depicts an embodiment of a process flow for adding a message to a message queue.

FIG. 2 shows an embodiment of an enqueue process flow 30 for adding a message to the message queue 10. A message queue record 17 is created, or generated, in the message queue 10 for the new message to be added, i.e., enqueued, to the message queue 10 (31). Data, including the message and its unique message id, is then entered into the respective fields of the newly created message queue record 17 (32).

A variable, e.g., n, is set to an initial value of one (33). A history table record 21 is then generated in the history table 20 for the new message/consumer n pair (34). Data is entered into the fields of the newly created history table record 21 for the new message and the consumer n (35). The new message's message id is stored in the message id field 22 of the new history table record 21. The consumer n is respective id is stored in the consumer id field 24 of the new history table record 21. An indication that the new message is enqueued and is to be accessed by the consumer n is stored in the message state field 26 of the new history table record 21. In an embodiment, applicable history log entry values are stored in the respective history log field 28 of the new history table record 21.

Once a new history table record is created for a message/consumer pair, the variable n is incremented (36). The variable n is then checked to see if its value is greater than the number of consumers that are to access the new enqueued message (37). If the variable n is not greater than the number of consumers that are to access the new enqueued message, a history table record 21 is created in the history table 20 for the new message/current consumer n pair (34), and appropriate data is entered into the respective fields of the newly created history table record 21 (35).

Once history table records 21 have been created (34) and data stored in their respective fields (35) for all the consumers that are to access the new enqueued message, processing associated with enqueuing a new message to the message queue 10 is ended (38).

Thus, for each consumer that is to access a message stored in the message queue 10, a corresponding history table record 21 is created (34). For example, if a MSG_A message is added to the message queue 10, and is to be accessed by two consumers, J and K, two records are created in the history table 20 (34), one record for the MSG_A message/consumer J pair and one record for the MSG_A message/consumer K pair.

An illustrative example of an embodiment of the results of an enqueue process flow 30 is shown in FIG. 3. At an initial time, there are no enqueued messages. Thus, as shown in FIG. 3A-1, there are no messages stored in the message queue 40. Also, as shown in FIG. 3A-2, there are no records, or entries, in the history table 42.

Sometime later, a new message is enqueued. As shown in FIG. 3B-1, a message queue record 46 is created in the message queue 44 for the new message. The new message is stored in the message field 47 of the message queue record 46. The new message's message id, MSG_X, is stored in the message id field 48 of the message queue record 46. In an embodiment, appropriate data is stored in the message properties field 50 of the message queue record 46.

For each consumer that is to access the MSG_X message, a history table record is created in the history table 52. In this example, as shown in FIG. 3B-2, three consumers, identified as A, B and C, are to access the MSG_X message. A history table record 54 is added to the history table 52 for consumer A, a history table record 56 is added for consumer B and a history table record 58 is added for consumer C. In each history table record 54, 56 and 58, the corresponding message id field 51 is set to MSG_X, the new message's message id. In history table record 54, the consumer id field 55 is set to A, to identify consumer A. Likewise, in history table record 56 the consumer id field 55 is set to B and in history table record 58 the consumer id field 55 is set to C, to identify respective consumers B and C.

In each history table record 54, 56 and 58, the message state field 57 is set to indicate the MSG_X message is enqueued and ready to be accessed by the identified consumer; e.g., the message state field 57 for each respective history table record 54, 56 and 58 is set to ENQUEUED.

For each history table record 54, 56 and 58, values can be written to the respective history log field 59, to provide further information regarding each message/consumer pair.

Figure 4:
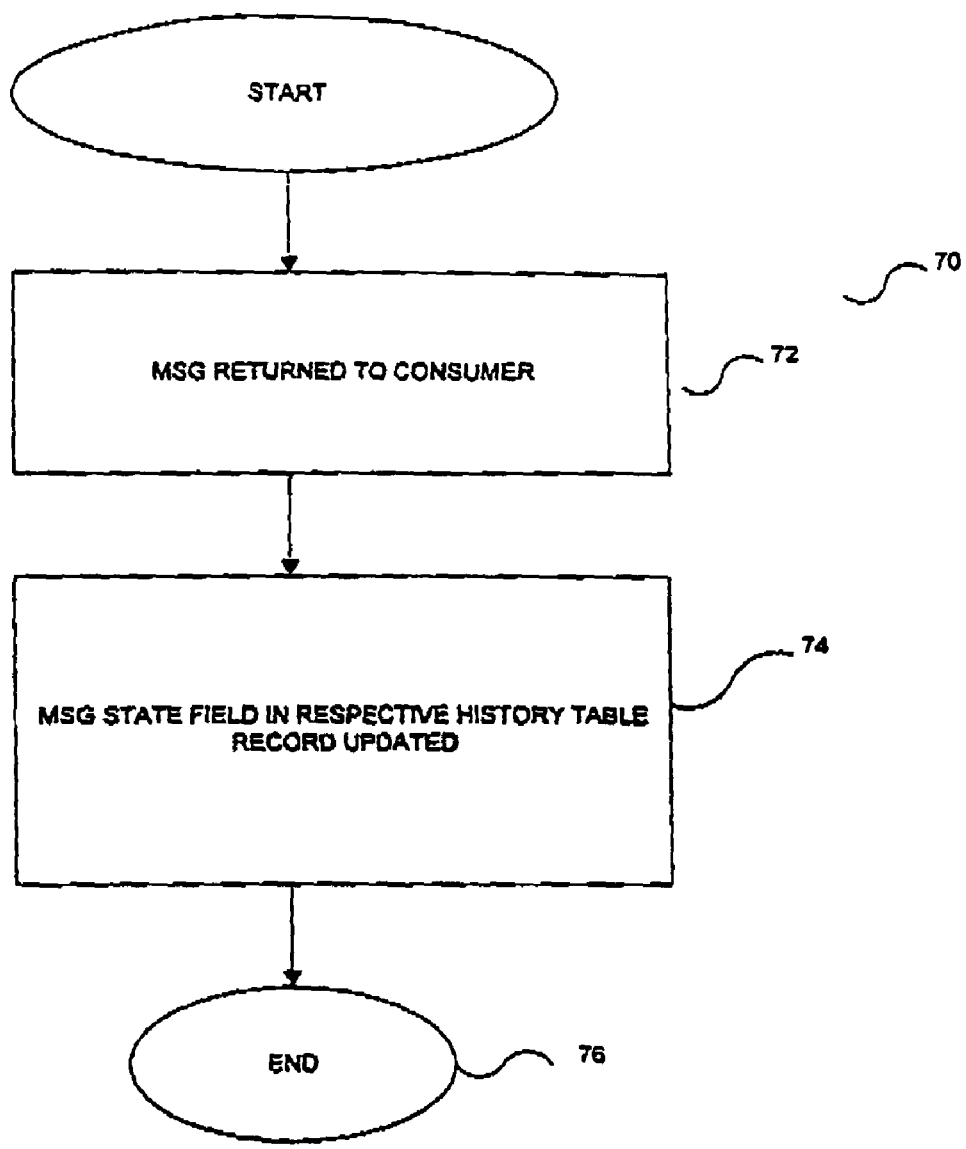
FIG. 4 depicts an embodiment of a process flow for a consumer read transaction.

FIG. 4 shows an embodiment of a process flow 70 for a consumer read, or access, of a message from the message queue 10. Upon a consumer's request to read an enqueued message, the next enqueued message to be read by the consumer is returned to the consumer (72). The message state field 26 of the history table record 21 associated with the returned message/consumer pair is updated (74). In an embodiment, the message state field of the history table record 21 for the returned message/consumer pair is set to indicate the consumer has read, or, more generally, accessed, the respective message. The processing for the read transaction is then ended (76).

In an embodiment, consumers read the enqueued messages, i.e., the messages stored in the message queue 10, in the order in which the history table records 21 for the message/consumer pairs are generated in the history table 20—on a first-in, first-out basis. An illustrative example of an embodiment of the results of a read transaction process flow 70 is shown in FIG. 3. As previously discussed, a MSG_X message is enqueued in the message queue 44 of FIG. 3B-1, and history table records 54, 56 and 58 of history table 52 of FIG. 3B-2 are for the consumers A, B and C who are to read the MSG_X message.

Sometime thereafter, consumer B reads a message from the message queue 44. The read transaction processing determines the first message in the message queue 44 that Consumer B has not read by locating the first record in the history table 52 with consumer B identified in the consumer id field 55 and with a message state field 57 value indicating the corresponding message has not yet been read. In this example, there is only one message, the MSG_X message, enqueued in the message queue 44, and consumer B has not yet read it.

The MSG_X message is returned to consumer B; consumer B's access of the MSG_X message does not affect the message queue record 46 for the MSG_X message in the message queue 44, as shown in FIG. 3C-1. As shown in FIG. 3C-2, the history table record 62 associated with the MSG_X message/consumer B pair is updated so that its message state field value 61 now indicates that consumer B has processed the MSG_X message; e.g., the message state field value 61 for history table record 62 is set to READ.

In another embodiment, consumers read the enqueued messages in a prescribed priority order. In an embodiment, a read-order table is used, along with the message queue 10 and history table 20, for consumers to read enqueued messages in a prioritized order, or, more generally, in an order other than that in which the messages are enqueued. In an embodiment, when a message is enqueued to the message queue 10, a record is also generated in the read-order table for each consumer that is to read the new enqueued message.

Figure 5:
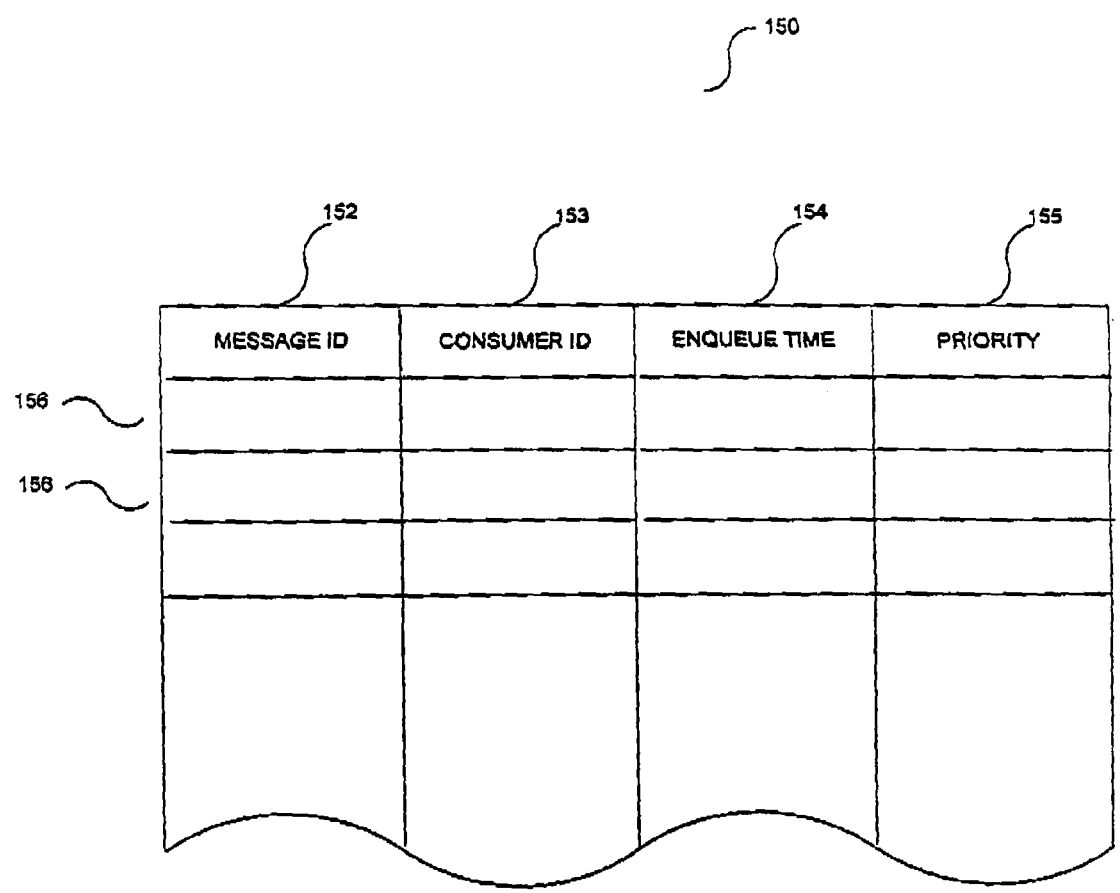
FIG. 5 is an embodiment of a read-order table.

Referring to FIG. 5, an embodiment of a read-order table 150 is used for consumer processing of enqueued messages in a prioritized order. An embodiment of a read-order table 150 is an index ordered by the consumer ids of the consumers that are to access the respective enqueued messages and a dequeue order of the message queue 10. In an embodiment, the dequeue order comprises the time, or relative time, that a respective message is queued to the message queue 10. In another embodiment, the dequeue order comprises the time, or relative time, that a message is queued to the message queue 10 and a priority value for a consumer to read the respective enqueued message.

A read-order table 150 comprises read-order records 156, one for each enqueued message/consumer pair. In an embodiment, each read-order record 156 comprises a message id field 152, a consumer id field 153 and one or more dequeue order fields. In an embodiment, each read-order record 156 comprises one dequeue order field; the dequeue order field is an enqueue time field 154. In another embodiment, each read-order record 156 comprises two dequeue order fields, comprising an enqueue time field 154 and a priority field 155.

The message id field 152 of a read-order record 156 is set to the message id of an enqueued message. An identification of a consumer that is to access the message identified by the respective message id stored in the message id field 152 of a read-order record 156 is stored in the corresponding consumer id field 153.

In an embodiment, the time that the message identified by the message id stored in one or more read-order records 156 is queued on the message queue 10 is written to the enqueue time field 154 of the respective read-order records 156. In another embodiment, an indication of the respective time that a message identified by the message id stored in one or more read-order records 156 is queued on the message queue 10 is written to the enqueue time field 154 of the respective read-order records 156. In an embodiment, the indication of the respective time a message is queued to the message queue 10 is based on the time other messages are queued to the message queue 10. In another embodiment, the indication of the respective time a message is queued to the message queue 10 is based on a predefined start, or initial, time.

In an embodiment read-order table 150 comprising one dequeue order field comprising an enqueue time field 154, the read-order table 150 acts as a FIFO (first-in, first-out) index. Consumers access messages on the message queue 10 based on the time the respective messages are stored on the message queue 10. In an embodiment, consumers access the earliest stored messages on the message queue 10 first. In an embodiment, the read-order table 150 is indexed on the consumer id field 153 and the dequeue order field(s); in the embodiment read-order table 150 comprising one dequeue order field comprising an enqueue time field 154, the read-order table 150 is indexed on the consumer id field 153 and the enqueue time field 154.

FIG. 7A-2 is an illustrative example of a read-order table 550 with one dequeue field comprising an enqueue time field 559. The read-order table 550 has six read-order records 551, 552, 553, 554, 555 and 556. Read-order table records 551 and 553 are for consumer A as noted by the respective consumer id field values. Read-order table records 552 and 554 are for consumer B, read-order table record 555 is for consumer C, and read-order table record 556 is for consumer D, as also noted by the respective consumer id field values.

Consumers A and B are to read, or more generally, access, the MSG_X message, as indicated by the message id field 557 and the consumer id field 558 of read-order records 551 and 552. The MSG_X message was enqueued at 8:05, as indicated by the enqueue time field values of read-order records 551 and 552.

Consumers A, B, C and D are to read the MSG_Y message, as indicated by the message id field 557 and the consumer id field 558 of read-order records 553, 554, 555 and 556. The MSG_Y message was enqueued at 9:10, after the MSG_X message, as indicated by the enqueue time field values of read-order records 553, 554, 555 and 556.

As noted, in an embodiment, read-order records are indexed on the consumer id field 558 and the enqueue time field 559. Thus, in an embodiment, the read-order records of read-order table 550 are ordered as follows: 551, 553, 552, 554, 555 and then 556. Read-order records 551 and 553 are indexed first, as they are for a first consumer, consumer A. Read-order record 551 is indexed before read-order record 553 as the MSG_X message was enqueued prior to the MSG_Y message; the MSG_X message is, therefore, is to be read by consumer A first, before the MSG_Y message. Thus, the first-ordered read-order record for consumer A is read-order record 551.

Read-order records 552 and 554 are indexed after read-order records 551 and 553, as they are for a second consumer, consumer B. Read-order record 552 is indexed before read-order record 554 as the MSG_X message was enqueued prior to the MSG_Y message; the MSG_X message is, therefore, to be read by consumer B first, before the MSG_Y message. Thus, the first-ordered read-order record for consumer B is read-order record 552.

Read-order record 555 is indexed after read-order records 551, 553, 552 and 554, as it is for a third consumer, consumer C. The first-ordered, and only, read-order record for consumer C is read-order record 555.

Read-order record 556 is the last read-order record indexed in the read-order table 550. Read-order record 556 is for a fourth consumer, consumer D. The first-ordered, and only, read-order record for consumer D is read-order record 556.

As noted, in an embodiment, the read-order table 150 comprises a priority field 155. The priority field 155 of a read-order record 156 is set to a priority value that indicates the order that the consumer identified by the respective consumer id field 153 is to access the message identified by the respective message id field 152.

In an embodiment read-order table 150 comprising two dequeue order fields comprising an enqueue time field 154 and a priority field 155, the read-order table 150 acts as a priority index. Consumers access messages in the message queue 10 based on both the time the respective messages are stored on the message queue 10 and the priority associated with the respective messages. In an embodiment, consumers access the earliest stored messages on the message queue 10 with the highest priority first. In an embodiment, the read-order table 150 is indexed on the consumer id field 153 and the dequeue order field(s); in the embodiment read-order table 150 comprising two dequeue order fields comprising an enqueue time field 154 and a priority field 155, the read-order table 150 is indexed on the consumer id field 153, the enqueue time field 154 and the priority field 155.

FIG. 8A-2 is an illustrative example of a read-order table 850 with two dequeue fields comprising an enqueue time field 852 and a priority field 854. The read-order table 850 has five read-order records 830, 831, 832, 833 and 834. Read-order table records 830, 832 and 834 are for consumer A as noted by the respective consumer id field values. Read-order table records 831 and 833 are for consumer B, as also noted by the respective consumer id field values.

Both consumers A and B are to read, or more generally, access, the MSG_X message, as indicated by the message id field 853 and the consumer id field 856 of read-order records 830 and 831. The MSG_X message was enqueued at 8:05, as indicated by the enqueue time field values of read-order records 830 and 831. The MSG_X message has a priority of two (2), as indicated by the priority field values of read-order records 830 and 831.

Consumers A and B are also to read the MSG_Y message, as indicated by the message id field 853 and the consumer id field 856 of read-order records 832 and 833. The MSG_Y message was enqueued at 8:30, after the MSG_X message, as indicated by the enqueue time field values of read-order records 832 and 833. The MSG_Y message has a priority of one (1), as indicated by the priority field values of read-order records 832 and 833.

Consumer A is also to read the MSG_Z message, as indicated by the message id field 853 and the consumer id field 856 of read-order record 834. The MSG_Z message was enqueued at 9:00, after both the MSG_X message and the MSG_Y message, as indicated by the enqueue time field value of read-order record 834. The MSG_Z message has a priority of one (1), as indicated by the priority field value of read-order record 834.

In an embodiment a lower number priority field value indicates a higher priority message; i.e., a message that is to be read on a higher priority basis. In an embodiment, the highest priority value is one (1). In an alternative embodiment, the highest priority value is zero (0).

In another embodiment, a lower number priority field value indicates a lower priority message; i.e., a message that is to be read on a lower priority basis.

As noted, in an embodiment, read-order records are indexed on the consumer id field 856, the enqueue time field 852 and the priority field 854 of a read-order table 850. Thus, in an embodiment, the read-order records of read-order table 850 are ordered as follows: 832, 834, 830, 833 and 831. Read-order records 832, 834 and 830 are indexed first, as they are for a first consumer, consumer A. Read-order record 832 is indexed before read-order records 834 or 830 as the MSG_Y message is the highest priority, earliest enqueued message for consumer A to read; the MSG_Y message is the first message consumer A is to read. The MSG_Y message has a priority of one (1), which is a higher priority than that assigned for the MSG_X message. The MSG_Y message was enqueued earlier than the MSG_Z message, which also has a priority of one (1). Thus, the read-order record 832 for the MSG_Y message/consumer A pair is the first-ordered read-order record for consumer A.

Read-order record 834 is indexed before read-order record 830 as the MSG_Z message has a higher priority, one (1), than the MSG_X message, with a priority of two (2).

Read-order records 833 and 831 are indexed after read-order records 832, 834 and 830, as they are for a second consumer, consumer B. Read-order record 833 is indexed before read-order record 831 as the MSG_Y message has a higher priority, one (1), than the MSG_X message, with a priority of two (2). Thus, the first-ordered read-order record for consumer B is the read-order record 833.

Figure 6:
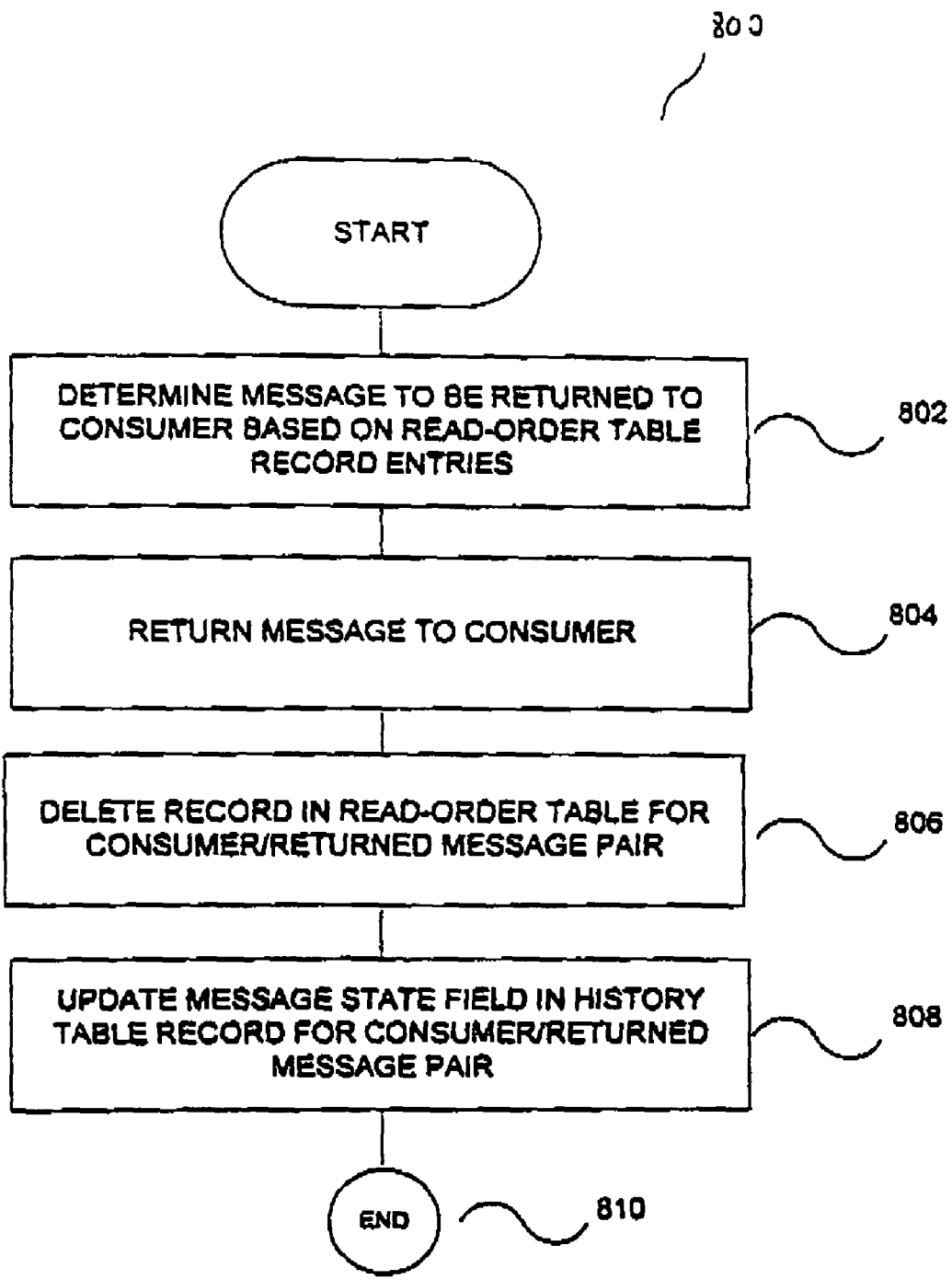
FIG. 6 depicts an embodiment of a process flow for a consumer read transaction using a read-order table.

FIG. 6 shows an embodiment of a process flow 800 for a consumer read, or access, of a message from a message queue 10, using a read-order table 150. Upon a consumer's request to read an enqueued message, the next message to be returned to the consumer is determined by the first-ordered read-order record 156 for the respective consumer in the read-order table 150 (802). The message in the message queue 10 that the respective read-order record 156 indicates is the current enqueued message to be returned to the consumer is then returned to the consumer (804).

The read-order record 156 for the returned message/consumer pair is deleted from the read-order table 150 (806). The message state field 26 of the history table record 21 associated with the returned message/consumer pair is updated (808). In an embodiment, the message state field of the history table record 21 for the returned message/consumer pair is set to indicate the consumer has read, or, more generally, accessed, the respective message. The processing for the read transaction using a read-order table 150 is then ended (810).

An illustrative example of an embodiment of the results of a read, or dequeue, transaction processing using a read-order table 150 with one dequeue field, an enqueue time field 154, is shown in FIG. 7. At an initial time, two messages are enqueued: the MSG_X message and the MSG_Y message, as shown by the two message queue records 530 and 532 in the message queue 525 of FIG. 7A-1.

Referring to the read-order table 550, shown in FIG. 7A-2, the MSG_X message was enqueued first, at 8:05, as indicated by the enqueue time field values in the read-order records 551 and 552. The MSG_Y message was enqueued second, after the MSG_X message, at 9:10, as indicated by the enqueue time field values in the read-order records 553, 554, 555 and 556. The read-order table 550 has two records 551 and 552 for the MSG_X message as there are two consumers, A and B, that are to read the MSG_X message. The read-order table 550 has four records 553, 554, 555 and 556 for the MSG_Y message as there are four consumers, A, B, C and D, that are to read the MSG_Y message.

In this illustrative example, as shown in FIG. 7A-3, the history table 575 has six history table records, 580, 581, 582, 583, 584 and 585; one for each enqueued message/consumer pair. History table record 580 is for the MSG_X message/consumer A pair; history table record 581 is for the MSG_X message/consumer B pair; and so on. The message state field 592 for history table record 580 indicates that consumer A has yet to read the MSG_X message; e.g., it reads ENQUEUED. Likewise, the message state field 592 for history table record 581 indicates that consumer B has yet to read the MSG_X message; it also reads ENQUEUED. The respective message state fields 592 for history table records 582, 583, 584 and 585 indicate that neither consumer A or B has read the MSG_Y message; e.g., each of the message state fields 592 for these history table records 582, 583, 584 and 585 read ENQUEUED.

Some time later, consumer B reads a message from the message queue 525. The read transaction processing determines the message in the message queue 525 that consumer B is to read by identifying the first-ordered read-order record in the read-order table 550 for consumer B; this first-ordered read-order record indicates the earliest enqueued message in the message queue 525 to be read by consumer B.

In this illustrative example, read-order record 552 is the first-ordered read-order record in the read-order table 550 for consumer B. Read-order record 552 indicates that the MSG_X message is the first enqueued message consumer B is to read, as it is the earliest enqueued message for consumer B. Thus, the MSG_X message is returned to consumer B. The read-order record 552 is deleted from the read-order table 550, as shown by the read-order table 595 of FIG. 7B-2.

As shown in FIG. 7B-3, the history table record 602 associated with the MSG_X message/consumer B pair is updated so that its message state field value now indicates that consumer B has processed the MSG_X message; the message state field 604 for history table record 602 is set to READ.

This read transaction processing did not affect the records in the message queue 525, as shown in FIG. 7B-1.

An illustrative example of an embodiment of the results of a read, or dequeue, transaction processing using a read-order table 150 with two dequeue fields, an enqueue time field 154 and a priority field 155, is shown in FIG. 8. At an initial time, three messages are enqueued: the MSG_X message, the MSG_Y message and the MSG_Z message, as shown by the three message queue records 826, 827 and 828 in the message queue 825 of FIG. 8A-1.

Referring to the read-order table 850, shown in FIG. 8A-2, the MSG_X message was enqueued first, at 8:05, as indicated by the enqueue time field values in the read-order records 830 and 831. The MSG_Y message was enqueued second, after the MSG_X message, at 8:30, as indicated by the enqueue time field values in the read-order records 832 and 833. The MSG_Z message was enqueued last, after the MSG_X message and the MSG_Y message, at 9:00, as indicated by the enqueue time field value in the read-order record 834.

The MSG_X message has a priority of two (2), as shown in the priority field 854 of the read-order records 830 and 831. The MSG_Y message has a priority of one (1), as shown in the priority field 854 of the read-order records 832 and 833. The MSG_Z message also has a priority of one (1), as shown in the priority field 854 of the read-order record 834.

The read-order table 850 has three read-order records 830, 832 and 834 for consumer A as consumer A is to read three messages: the MSG_X message, the MSG_Y message, and the MSG_Z message. The MSG_Y message and the MSG_Z message both have a priority of one (1), while the MSG_X message has a priority of two (2). Thus, consumer A is to read the MSG_Y message and the MSG_Z message before reading the MSG_X message. The MSG_Y message was enqueued earlier, at 8:30, than the MSG_Z message, which was enqueued at 9:00. Thus, consumer A is to read the MSG_Y message before reading the MSG_Z message. The respective read-order record 832 for the MSG_Y message/consumer A pair is the first-ordered read-order record for consumer A.

The read-order table 850 has two read-order records 831 and 833 for consumer B as consumer B is to read two messages: the MSG_X message and the MSG_Y message. The MSG_Y message has a priority of one (1), while the MSG_X message has a priority of two (2). Thus, consumer B is to read the MSG_Y message before the MSG_X message. The respective read-order record 833 for the MSG_Y message/consumer B pair is the first-ordered read-order record for consumer B.

In this illustrative example, as shown in FIG. 8A-3, the history table 875 has five history table records, 841, 842, 843, 844 and 845; one for each enqueued message/consumer pair. History table record 841 is for the MSG_X message/consumer A pair; history table record 842 is for the MSG_X message/consumer B pair; and so on.

The message state field 846 for the history table record 841 indicates that consumer A has yet to read the MSG_X message; e.g., it reads ENQUEUED. Likewise, the message state field 846 for history table record 842 indicates that consumer B has yet to read the MSG_X message; it also reads ENQUEUED. The respective message state fields 846 for history table records 843 and 844 indicate that neither consumer A or B has read the MSG_Y message; e.g., each of the message state fields 846 for these history table records 843 and 844 read ENQUEUED. The message state field 846 for the history table record 845 also reads ENQUEUED, indicating that consumer A has not yet read the MSG_Z message.

Some time later, consumer A reads a message from the message queue 825. The read transaction processing determines the message in the message queue 825 that consumer A is to read by identifying the first-ordered read-order record for consumer A in the read-order table 850. As previously indicated, the first-ordered read-order record for consumer A is read-order record 832, indicating that consumer A is to read the MSG_Y message.

The MSG_Y message is returned to consumer A. The read-order record 832 for consumer A's read of the MSG_Y message is deleted from the read-order table, as shown in FIG. 8B-2.

The history table record 882 associated with the MSG_Y message/consumer A pair is updated so that its message state field value now indicates that consumer A has processed the MSG_Y message; as shown in FIG. 8B-3, the message state field 884 for history table record 882 is set to READ.

This read transaction processing did not affect the records in the message queue 825, as shown in FIG. 8B-1.

Figure 9:
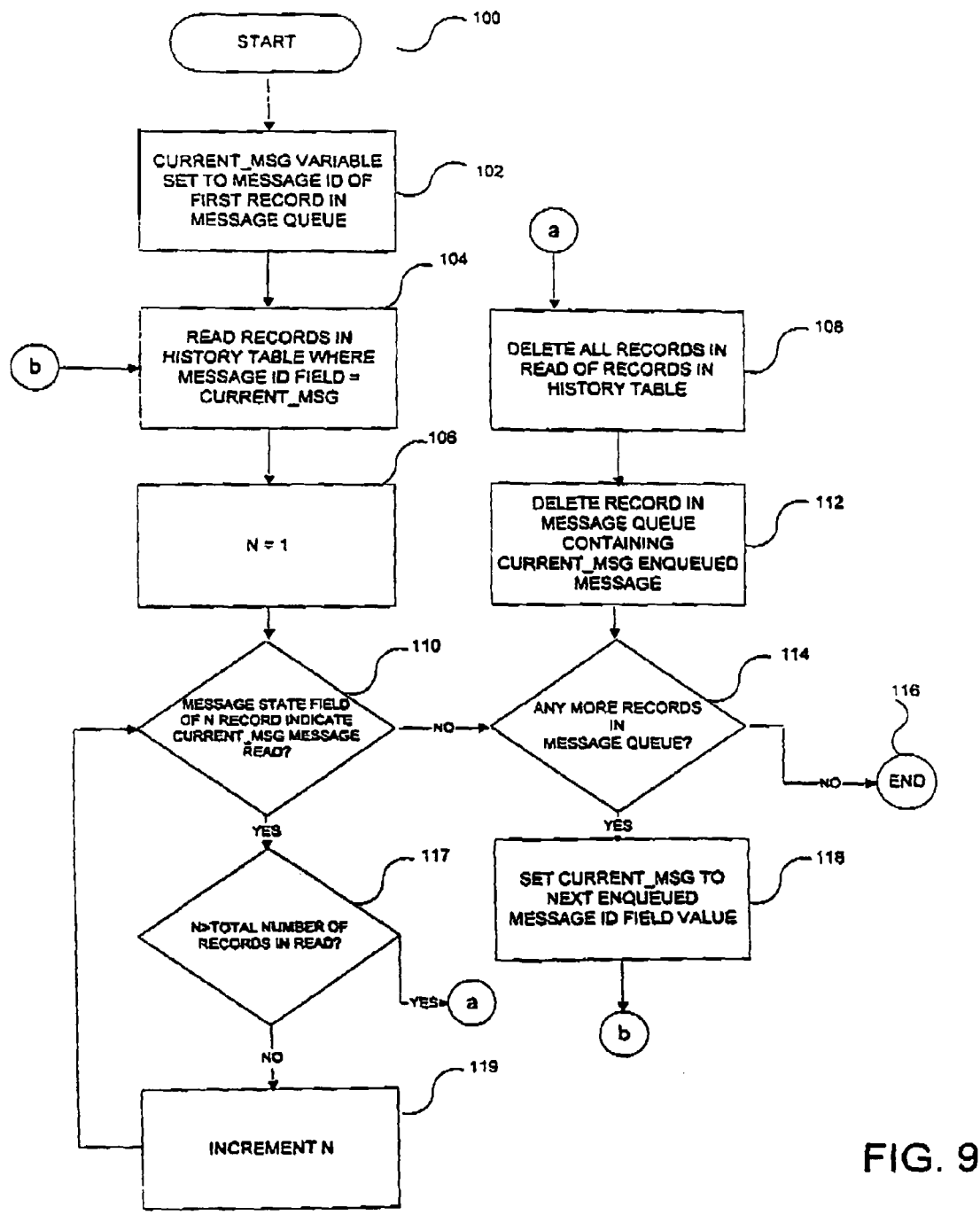
FIG. 9 depicts an embodiment of a process flow for deleting messages from a message queue.

FIG. 9 shows an embodiment of a deletion, or garbage collection, process flow 100 for deleting enqueued messages from the message queue 10 of FIG. 1. A variable, e.g., current_msg, is set to the value of the message id field 14 of the first message queue record in the message queue 10 (102). The history table records 21 of the history table 20 that have corresponding message id field values set to current_msg are then read from the history table (104).

A variable, e.g., n, to be used for looping through the history table records 21 read from the history table 20, i.e., read history records, is initialized to one (106). The message state field 26 of the n record in the read history records is checked to see if it indicates that the current_msg message has been read by the corresponding consumer (110). If yes, the variable n is checked to see if it is greater than the total number of history table records 21 in the read history records (117). If no, meaning that not all the history table records 21 in the read history records have had their message state fields 26 checked, the variable n is incremented (119), and the message state field 26 of the new n record in the read history records is checked to see if it indicates that the current_msg message has been read by the corresponding consumer, as previously described (110).

If, however, the variable n is greater than the total number of history table records 21 in the read history records, then all the history table records 21 in the read history records have been checked, and each of their respective message state fields 26 indicate the current_msg message has been read by the corresponding consumer. In this case, all the history table records 21 in the read history records are deleted from the history table 20 (108). Also, the message queue record 17 for the current_msg enqueued message is deleted from the message queue 10 (112). Then, a check is made to ascertain if there are any more message queue records 17 whose corresponding history table records 21 have not yet been read and checked (114). If no, meaning all the history table records 21 for all the message queue records 17 have been checked to see if the respective consumer has read the corresponding enqueued message, the garbage collection process flow 100 is ended (116).

If, however, there are message queue records 17 whose corresponding history table records 21 have not yet been read and checked, the current_msg variable is set to the value of the message id field 14 of the next message queue record 17 in the message queue 10 (118). The garbage collection process flow 100 for the next enqueued message is then repeated, as previously described.

As previously described, the message state field 26 of the n record in the read history records is checked to see if it indicates that the current_msg message has been read by the corresponding consumer (110). If no, then not all consumers have read the current_msg message and it is not to be deleted from the message queue 10 at this time. A check is then made to see if there are any more message queue records 17 whose corresponding history table records 21 have not yet been read and checked (114). If there are none, the garbage collection process flow 100 is ended (116). If, however, there are message queue records 17 whose corresponding history table records 21 are yet to be checked, the current_msg variable is set to the message id field value of the next message queue record 17 (118), and processing continues as previously described.

An illustrative example of an embodiment of the results of a garbage collection process flow 100 is shown in FIG. 10. At an initial time, there are two enqueued messages in the message queue 125, as shown in FIG. 10A-1; a MSG_A message in message queue record 142, and a MSG_B message in message queue record 144. Two consumers, J and K, are to read the MSG_A message, as shown by history table records 129 and 131 of the history table 127 of FIG. 10A-2. Four consumers, W, X, Y and Z, are to read the MSG_B message, as shown by the history table records 145, 146, 147 and 148 of the history table 127.

The garbage collection process flow 100, when initiated, sets the current_msg variable to the value of the message id field of the first message queue record 142, i.e., in this example, current_msg is set to MSG_A. All the history table records in the history table 127 with message id field values equal to MSG_A are then read; in this example, there are two records, 129 and 131, in the read history records. The first read history record, history table record 129, is checked to see if its message state field indicates that the corresponding consumer J has read the MSG_A message. Consumer J has read the MSG_A message, as indicated by the READ value in the message state field 136.

The second, and last, read history record, history table record 131, is checked to see if its message state field indicates that the corresponding consumer K has read the MSG_A message. Consumer K has read the MSG_A message, as indicated by the READ value in the message state field 158. Thus, both consumers J and K that were to read the MSG_A message have read it. The history table records 129 and 131 for the MSG_A message are deleted from the history table. The message queue record 133 for the MSG_A message is also deleted from the message queue.

At this time, the message queue 137, shown in FIG. 10B-1, no longer contains a message queue record for the MSG_A message. Also at this time, the history table 139, shown in FIG. 10B-2, no longer contains history table records for any MSG_A message/consumer pair.

The garbage collection process flow 100 then checks if there are any more records in the message queue 137 whose corresponding history table records have not yet been read and checked. In this example there are; the message queue record 141 for the MSG_B message. The current_msg variable is set to the message queue record 141 message id field value, i.e., MSG_B. The history table records with message id field values equal to MSG_B are read from the history table 139; i.e., history table records 132, 133, 134 and 135 are read from the history table 139. The first read history record, history table record 132, is checked to see if its message state field indicates that the corresponding consumer W has read the MSG_B message. Consumer W has not read the MSG_B message, as indicated by the ENQUEUED value in the message state field 143.

As at least one consumer has not yet read the MSG_B message, neither the history table records 132, 133, 134 and 135 for the MSG_B message, or the message queue record 141 for the MSG_B message are deleted from their respective tables at this time.

The garbage collection process flow 100 then again checks if there are any more records in the message queue 137 whose corresponding history table records have not yet been read and checked. In this example, there are not, and the garbage collection process flow 100 is ended.

In this embodiment for garbage collection processing, the records in the history table for all the enqueued messages are all read and one or more are checked. Thus, even if no consumer has yet accessed an enqueued message, e.g., a MSG_A message, at a time garbage collection processing is initiated, the history table records for the MSG_A message are read, and the first read history record is checked to see if its message state field indicates the corresponding consumer has read the MSG_A message.

Figure 11:
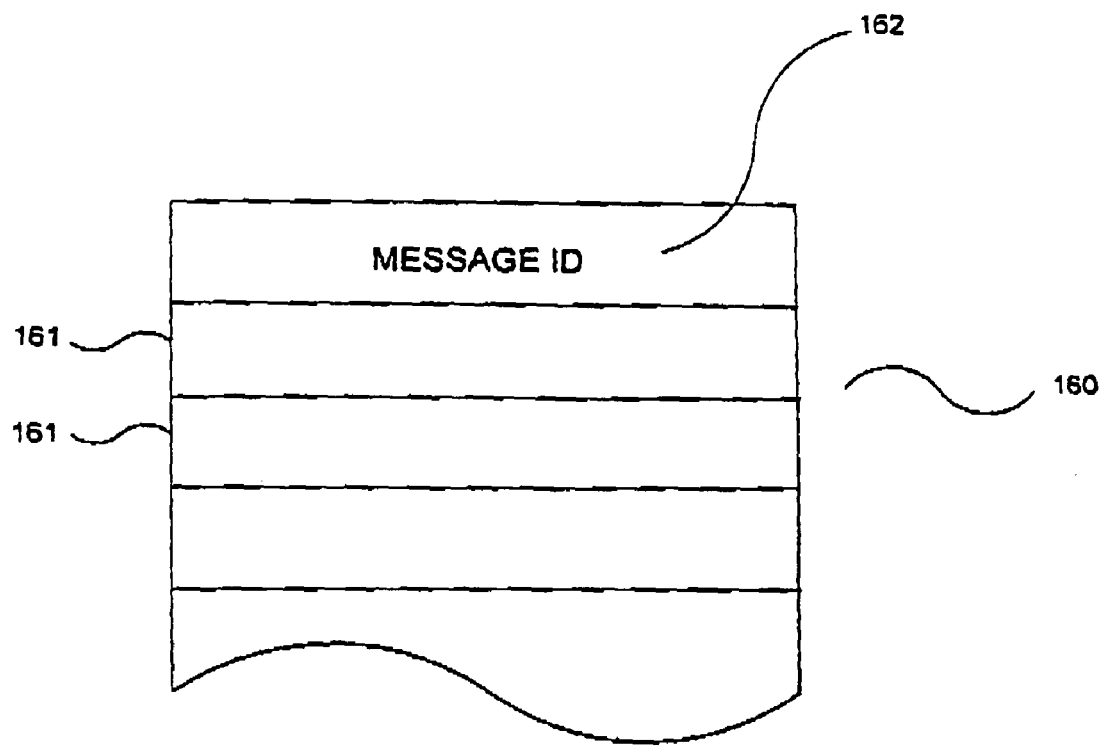
FIG. 11 is an embodiment of a work list table.

In another embodiment, a work list table is used for facilitating garbage collection processing. Referring to FIG. 11, an embodiment work list table 160 is shown. The work list table 160 comprises work list entries for each enqueued message that has been accessed by each consumer. In an embodiment, the work list entries are each a field in a work list record 161 in the work list table 160. In an alternative embodiment, the work list entries are each a work list record 161 in the work list table 160.

Each work list entry comprises a message id field 162. When a consumer reads an enqueued message in the message queue 10, the message's message id is written, or otherwise stored, in the message id field 162 of a work list entry in the work list table 160. In an embodiment, the work list table 160 is a queue, in which work list entries are processed on a first-in, first-out basis.

Figure 12:
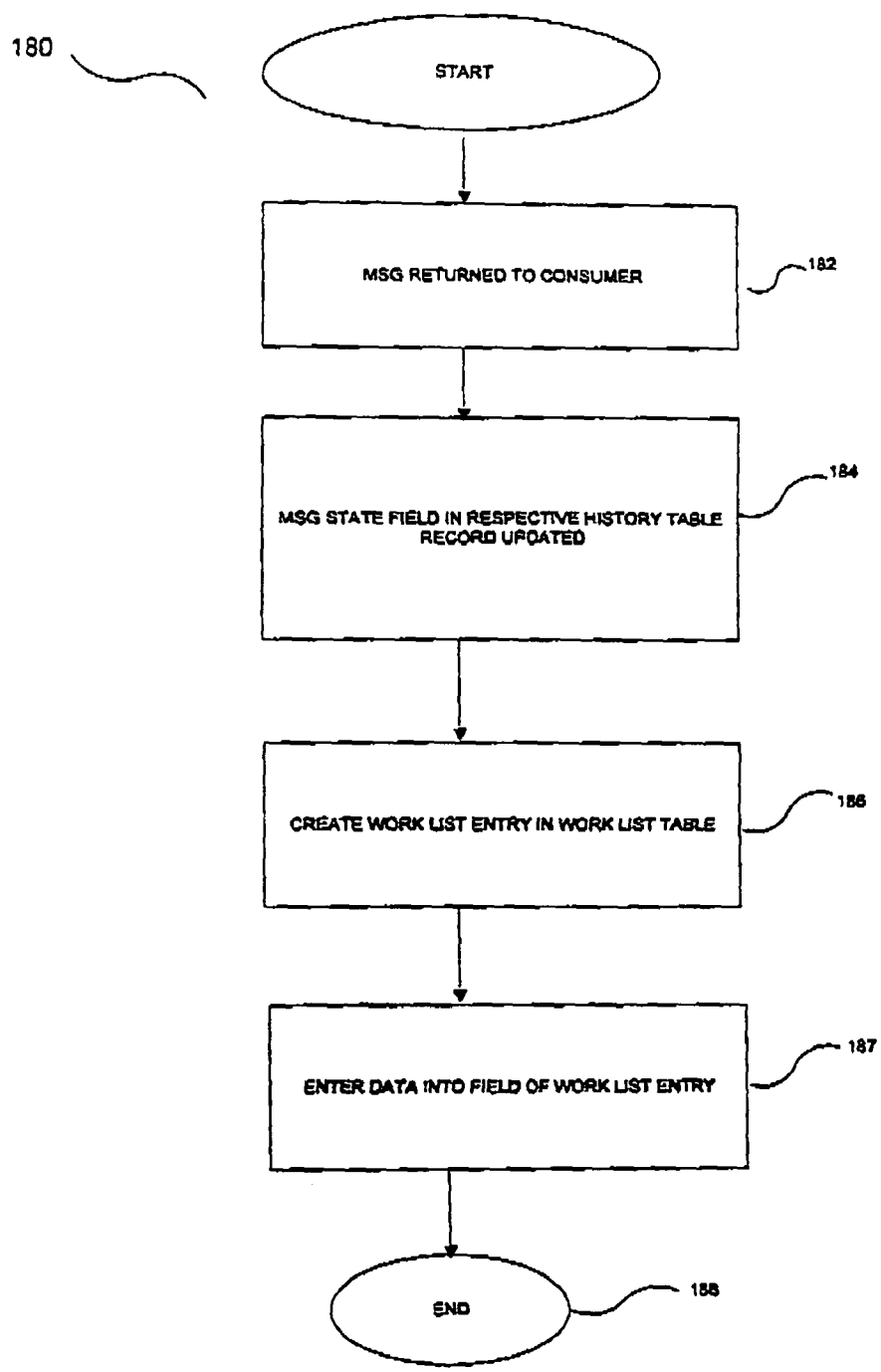
FIG. 12 depicts an embodiment of a process flow for a consumer read transaction using a work list table.

An embodiment of a read, or more generally, access, transaction processing flow 180, using a work list table 160, is shown in FIG. 12. Upon a consumer's request to read an enqueued message, the next enqueued message to be read by the consumer is returned to the consumer (182). If a read-order table is used, upon a consumer's request to read an enqueued message, the next message returned to the consumer is determined by the first-ordered read-order record for the respective consumer in the read-order table. The read-order record for the returned message/consumer pair is deleted from the read-order table.

The message state field 26 of the history table record 21 associated with the returned message/consumer pair is updated to indicate the consumer has read, or, more generally, accessed, the respective message (184).

If the read transaction for the returned message/consumer pair is successful, a work list entry is created, or generated, in the work list table 160 for the message that has been returned to the consumer (186). The new work list entry indicates that the respective message returned to the consumer has been successfully processed by the consumer. Data is then entered into the respective message id field 162 of the newly created work list entry (187); the message id of the message returned to the consumer is written to the message id field 162 of the newly created work list entry. The processing for the read is then ended (188). Thereafter, when the transaction containing the read is completed, i.e., it is either committed or aborted, the addition to the work list table 160, the deletion from the read-order table 150, and the update to the history table 20 are also committed or aborted.

An illustrative example of an embodiment of the results of a read transaction process flow 180, involving a work list table, is shown in FIGS. 13A and 13B. At an initial time, a first, MSG_X message is enqueued in the message queue 200 of FIG. 13A-1, as shown by message queue record 201. History table records 206 and 208 have been created in history table 202 for respective consumers A and B who are to read the MSG_X message, as shown in FIG. 13A-2. A second, MSG_Y message is also enqueued in the message queue 200, as shown by message queue record 203. History table records 210, 212, 214 and 216 have been created in history table 202 for consumers A, B, C and D who are to read the MSG_Y message. At this initial time, no consumer has read, or more generally, accessed, any message, and, thus, the work list table 204 of FIG. 13A-3 is empty.

Sometime later, consumer B reads the MSG_X message. The MSG_X message is returned to consumer B. The history table record 218 associated with consumer B's read is updated so that its message state field value 211 now indicates that consumer B has processed the MSG_X message, as shown in FIG. 13B-2; i.e., the message state field value 211 is READ. Consumer B's read of the MSG_X message does not affect the message queue table 200, as shown in FIG. 13B-1.

The work list table 212 is also updated as part of consumer B's read of the MSG_X message, as shown in FIG. 13B-3. A work list entry, e.g., work list record 214, is added to the work list table 212; work list record 214 comprises the MSG_X message id.

Figure 14:
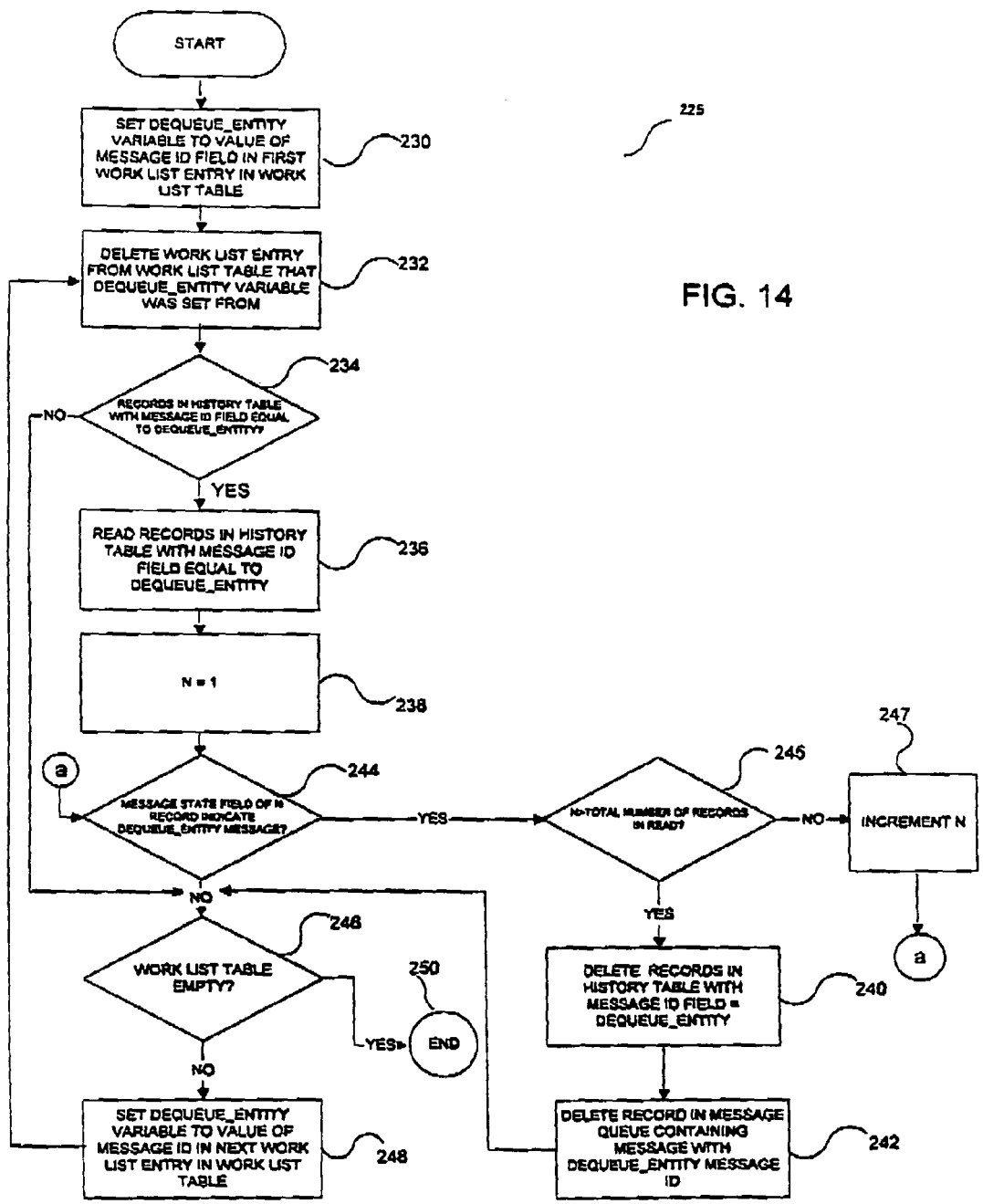
FIG. 14 depicts an embodiment of a process flow for deleting messages from a message queue, using a work list table.

FIG. 14 shows an embodiment of a deletion, or garbage collection, process flow 225, using a work list table 160 of FIG. 11, for deleting enqueued messages from a message queue 10. A variable, e.g., dequeue_entity, is set to the value of the message id field 162 of a first work list entry in the work list table 160 (230). The work list table entry that the dequeue_entity variable is set from is thereafter deleted from the work list table 160 (232).

The history table 20 is checked to see if there are any history table records 21 with a message id field value equal to dequeue_entity (234). If no, the work list table 160 is checked to see if it is empty (246). If the work list table 160 has no more work list entries, the garbage collection process flow 225 is ended (250). If, however, the work list table 160 does have more work list entries, the dequeue_entity variable is set to the value of the message id field 162 of the current first work list entry in the work list table 160 (248). The garbage collection process flow 225 continues as previously described, with the work list table entry that the dequeue_entity variable is set from deleted from the work list table 160 (232).

As previously described, once the dequeue_entity variable is set from the message id field 162 of a work list entry, the history table 20 is checked to see if there are any history table records 21 with a message id field value equal to dequeue_entity (234). If there are, those respective history table records 21 are read from the history table (236).

A variable, e.g., n, to be used for looping through the history table records read from the history table 20, i.e., the read history records, is initialized to one (238). The message state field 26 of the n record in the read history records is then checked to see if it indicates that the message identified by the dequeue_entity message id, i.e., the dequeue_entity message, has been read by the corresponding consumer (244). If no, there is at least one consumer that has not read the dequeue_entity message, and the message queue record 17 for the dequeue_entity message is not to be deleted from the message queue 10. The work list table 160 is then checked to see if it is empty (246). If the work list table 160 has no more work list entries, the garbage collection process flow 225 is ended (250), as previously described. If, however, the work list table 160 does have more work list entries, the dequeue_entity variable is set to the value of the message id field 162 of the current first work list entry in the work list table 160 (248) and the garbage collection process flow 225 continues as previously described.

As previously noted, the message state field 26 of the n record in the read history records is checked to see if it indicates that the dequeue_entity message has been read by the corresponding consumer (244). If the dequeue_entity message has been read by the corresponding consumer, the variable n is checked to see if it is greater than the total number of read history records 21 (245). If, no, meaning that not all the history table records 21 in the read history records have had their message state fields 26 checked, the variable n is incremented (247), and the message state field 26 of the new n record of the read history records is checked to see if it indicates that the dequeue_entity message has been read by the corresponding consumer (244), as previously described.

If, however, the variable n is greater than the total number of history table records 21 in the read history records, then all the history table records 21 in the read history records have been checked, and each of their respective message state fields 26 indicate the dequeue_entity message has been read by the corresponding consumer. In this case, all the history table records 21 in the read history records are deleted from the history table 20 (240); i.e., the history table records for the dequeue_entity message are deleted from the history table 20. Also, the message queue record 17 for the dequeue_entity message is deleted from the message queue 10 (242). The work list table 160 is then checked to see if it is empty (246), and processing proceeds as previously described.

In the embodiment of the garbage collection process flow 225, only records in the history table 20 for messages identified in the work list table 160 are read and processed. Thus, if no consumer has yet read an enqueued message, e.g., a MSG_A message, at the time the garbage collection process flow 225 is initiated, the records in the history table for the MSG_A message are not read, and are not unnecessarily checked to see if the respective consumer has read the MSG_A message.

In an embodiment, the history table 20 is indexed on the message id field 22. In this manner, the garbage collection process 225 can determine that it has checked all the history table records 21 identified by a respective work list entry when it encounters a history table record 21 with a different message id field value than that stored in the work list entry, or reaches the end of the history table. In another embodiment, the total number of history table records 21, or count, for a respective enqueued message may be stored as a field in each of the work list entries. In this manner, the garbage collection process 225 can determine that it has checked all the history table records 21 identified by a respective work list entry using an index or the count stored in the respective work list entry.

In an embodiment, the garbage collection process 225 is transactional. If the garbage collection process 225 is aborted for any reason, the deletion of any work list entries, the deletion of any history table records 21, and the deletion of any message queue records 17 done during the execution of the aborted garbage collection processing will be automatically undone.

Figure 15:
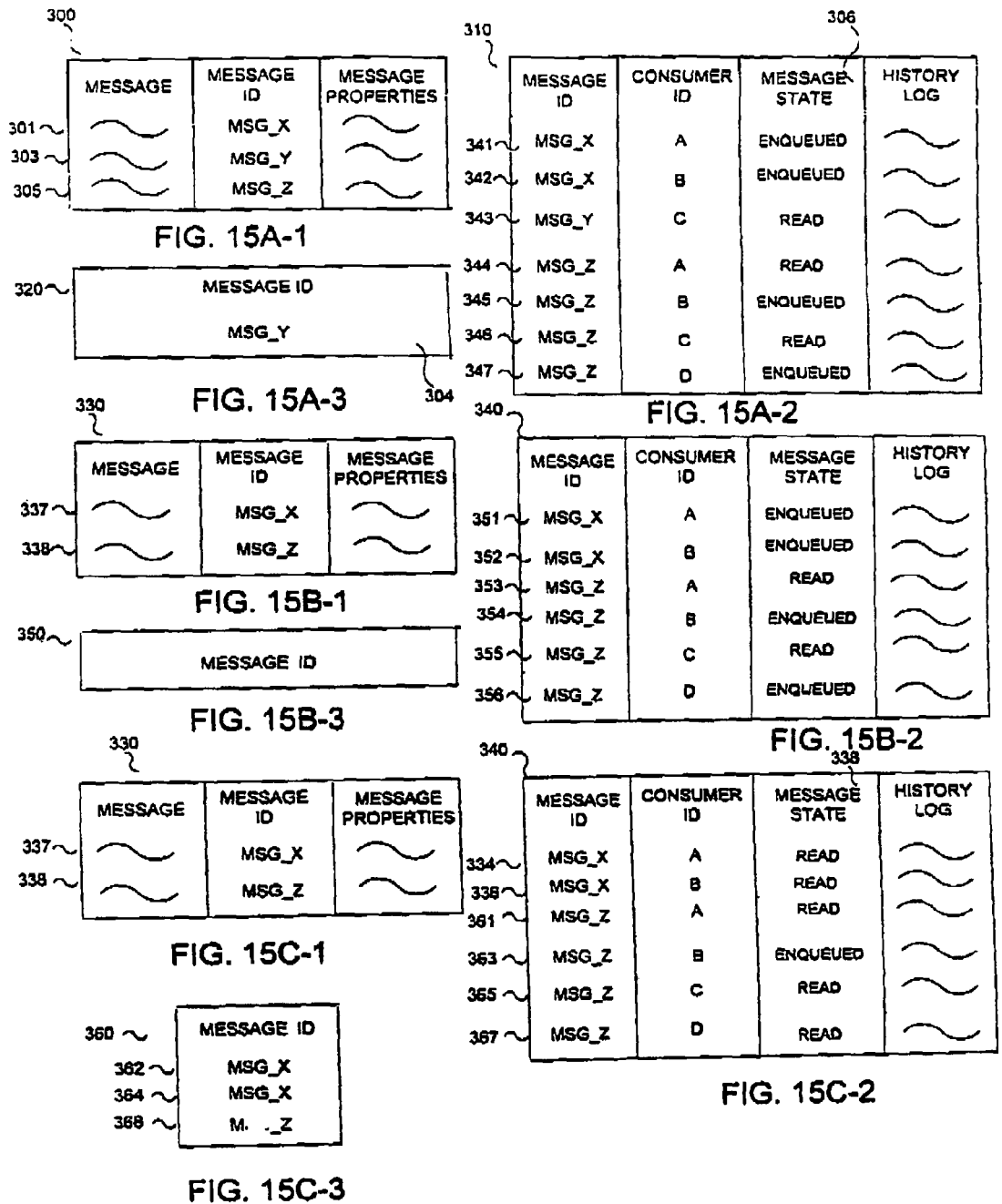
FIGS. 15A, 15B, 15C, 15D, 15E and 15F depict illustrative examples of an embodiment of the results of a garbage collection process flow using a work list table.

An illustrative example of an embodiment of the results of a garbage collection processing flow 225 is shown in FIGS. 15A-15F. At an initial time, there are three enqueued messages in the message queue 300, as shown in FIG. 15A-1; a MSG_X message in message queue record 301, a MSG_Y message in message queue record 303, and a MSG_Z message in the message queue record 305.

Two consumers, A and B, are to read the MSG_X message, as shown by history table records 341 and 342 of the history table 310 of FIG. 15A-2. In each of history table records 341 and 342, the message state field 306 indicates that the corresponding consumer, A and B respectively, have not yet read the MSG_X message; each of the message state fields 306 for history table records 341 and 342 read ENQUEUED.

One consumer, C, is to read the MSG_Y message, as shown by the history table record 343 of the history table 310. The message state field 306 of the history table record 343 indicates that the consumer C has already read the MSG_Y message; the message state field 306 for history table record 343 reads READ.

Four consumers, A, B, C and D, are to read the MSG_Z message, as shown by the history table records 344, 345, 346 and 347. In each of the history table records 344 and 346, the message state field 306 indicates that the corresponding consumer, A and C respectively, have already read the MSG_Z message; the message state field 306 for history table records 344 and 346 read READ. In each of the history table records 345 and 347, the message state field 306 indicates that the corresponding consumer, B and D respectively, have not yet read the MSG_Z message; each of the message state fields 306 for history table records 345 and 347 read ENQUEUED.

At this initial time, the work list table 320, as shown in FIG. 15A-3, has one work list record 304. The work list record 304 comprises the MSG_Y message id.

The garbage collection process flow 225 sets the dequeue_entity variable to the message id field value of the first, and only, work list record, 304; i.e., dequeue_entity is set to MSG_Y. The work list record 304 is then deleted. The history table 310 is checked to see if there are any history table records with a message id field value equal to MSG_Y. There is one, and thus, history table record 343 is read from the history table 310.

The first, and only, history table record 343 read from the history table 310 is checked to see if the respective consumer, C, has read the MSG_Y message; i.e., the message state field 306 of the history table record 343 is checked for a value of READ. The message state field 306 of the history table record 343 does have a value of READ, so history table record 343 is deleted from the history table 310. The message queue record 303, for the MSG_Y message, is also deleted from the message queue 300.

After the deletion of history table record 343 and the deletion of message queue record 303, as shown in FIG. 15B-1, the message queue 330 has two remaining enqueued messages; the MSG_X message in message queue record 337 and the MSG_Z message in message queue record 338.

As shown in FIG. 15B-2, at this time, the history table 340 has two history table records, 351 and 352, for the MSG_X message, one for each of the consumers A and B that are to read the MSG_X message. The history table 340 also has four history table records, 353, 354, 355, and 356, for the MSG_Z message, one for each of the four consumers A, B, C and D that are to read the MSG_Z message.

As shown in FIG. 15B-3, the work list table 350 is now empty. The garbage collection processing is, thus, ended, as the work list table 350 has no work list entries to process.

At a second time, there are still two enqueued messages in the message queue 330, as shown in FIG. 15C-1; the MSG_X message in message queue record 337 and the MSG_Z message in message queue record 338.

As before, two consumers, A and B, are to read the MSG_X message, as shown by history table records 334 and 336 of the history table 340 of FIG. 15C-2. In each of history table records 334 and 336, the message state field 338 indicates that the corresponding consumer, A and B respectively, have already read the MSG_X message; each of the message state fields 338 for history table records 334 and 336 read READ.

Four consumers, A, B, C and D, are to read the MSG_Z message, as shown by the history table records 361, 363, 365 and 367. In each of the history table records 361, 365 and 367, the message state field 338 indicates that the corresponding consumer, A, C and D respectively, have already read the MSG_Z message; the message state field 338 for history table records 361, 365 and 367 read READ. In the history table record 363, however, the message state field 338 indicates that the corresponding consumer, B, has not yet read the MSG_Z message; the message state field 338 for history table record 363 reads ENQUEUED.

At this second time, the work list table 360, shown in FIG. 15C-3, has three work list records. The first work list record 362 comprises the MSG_X message id; the second work list record 364 comprises the MSG_X message id; and the third, and last, work list record 366 comprises the MSG_Z message id.

The garbage collection process flow 225 sets the dequeue_entity variable to the message id field value of the first work list record 362; i.e., dequeue_entity is set to MSG_X. The work list record 362 is then deleted. The history table 340 is checked to see if there are any history table records with a message id field value equal to MSG_X. There are two, history table records 334 and 336, and, thus, history table records 334 and 336 are read from the history table 340.

The first read history table record 334 is checked to see if the respective consumer, A, has read the MSG_X message. Consumer A has read the MSG_X message; the message state field 338 of the history table record 334 has a value of READ. The second, and last, read history table record 336 is checked to see if the respective consumer, B, has read the MSG_X message. Consumer B has also read the MSG_X message; the message state field 338 of the history table record 336 has a value of READ. All the history table records currently read from the history table 340 indicate that the respective consumer has read the MSG_X message. Thus, the history table records 334 and 336 are deleted from the history table 340. The message queue record 337 for the MSG_X message is also deleted from the message queue 330 of FIG. 15C-1.

After the deletion of history table records 334 and 336 from the history table and the deletion of message queue record 337 from the message queue, as shown in FIG. 15D-1, the message queue 370 has one remaining enqueued message; the MSG_Z message in message queue record 371.

As shown in FIG. 15D-2, at this time, the history table 380 has four history table records, 382, 384, 386, and 388, for the MSG_Z message, one for each of the four consumers A, B, C and D that are to read the MSG_Z message.

As shown in FIG. 15D-3, the work list table 390 has two remaining work list records. The first work list record 392 comprises the MSG_X message id, and the second, and last, work list record 394 comprises the MSG_Z message id.

The work list table 390 is not empty, so the garbage collection process flow 225 sets the dequeue_entity variable to the message id field value of the first work list record 392; i.e., dequeue_entity is set to MSG_X. The work list record 392 is then deleted from the work list table 390. The history table 380 is checked to see if there are any history table records with a message id field value equal to MSG_X. There are none, as the history table records associated with the MSG_X message have all been previously deleted. Thus, there is no further garbage collection processing required for the deleted work list record 392.

At this time, the message queue 370 continues to have one remaining enqueued message; the MSG_Z message stored in message queue record 371, as shown in FIG. 15E-1. As shown in FIG. 15E-2, the history table 380 has four history table records, 382, 384, 386, and 388, for the MSG_Z message, one for each of the four consumers A, B, C and D that are to read the MSG_Z message. The work list table 400 has one remaining work list record, as shown in FIG. 15E-3. The first, and only, work list record 402 comprises the MSG_Z message id.

The work list table 400 is not empty, so the garbage collection process flow 225 sets the dequeue_entity variable to the message id field value of the first work list record 402; i.e., dequeue_entity is set to MSG_Z. The work list record 402 is then deleted from the work list table 400. The history table 380 is checked to see if there are any history table records with a message id field value equal to MSG_Z. There are four history table records, 382, 384, 386 and 388, with a MSG_Z message id field value. Thus, history table records 382, 384, 386 and 388 are read from the history table 380.

The first read history table record 382 is checked to see if the respective consumer, A, has read the MSG_Z message. Consumer A has read the MSG_Z message; the message state field 374 of the history table record 382 has a value of READ.

The second read history table record 384 is then checked to see if the respective consumer, B, has read the MSG_Z message. Consumer B has not read the MSG_Z message; the message state field 374 of the history table record 384 has a value of ENQUEUED. It is not necessary to check the message state fields 374 of the other read history records 386 and 388 at this time as there is at least one consumer, B, that has not read the MSG_Z message. As all the consumers that are to read the MSG_Z message have not read it, neither the history table records 382, 384, 386 and 388 for the MSG_Z message or the message queue record 371 for the MSG_Z message are deleted at this time.

As shown in FIG. 15F-1, the message queue 370 continues to have one record 371 for the MSG_Z message. At this time, shown in FIG. 15F-2, the history table 380 continues to have four records for the MSG_Z message, one for each of the consumers A, B, C and D that are to read the MSG_Z message. The work list table 410 is now empty, as shown in FIG. 15F-3. The garbage collection processing is, thus, ended, as the work list table 410 has no work list entries to process.

In an embodiment, garbage collection processing processes, or batches, multiple work list entries and performs the required actions in a single transaction. This reduces the overhead of deferring garbage collection processing, and is used to eliminate hot spots without significantly increasing processing overhead.

Figure 16:
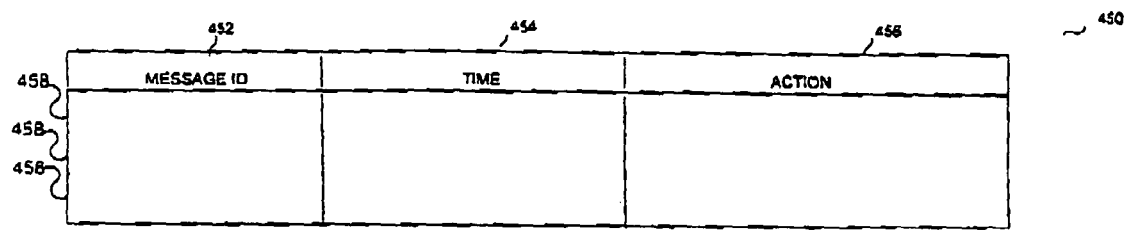
FIG. 16 is an embodiment of a work item table.

A work item table 450, shown in FIG. 16, is another embodiment of a work list table. Work item table 450 is used for purposes in addition to garbage collection processing. The work item table 450 is also used to delete message queue records 17 from the message queue 10 prior to all respective consumers reading the respective message(s). Additionally, the work item table 450 is used to allow consumers to access an enqueued message only at a time later than when the message is actually enqueued.

The work item table 450 comprises work records 458. Each work record 458 comprises a message id field 452, a time field 454 and an action field 456. In other embodiments, other and/or additional fields may be included in the work records 458, for example, a consumer field identifying the consumers that are to read the message identified by the respective message id field 452.

The message id field 452 of a work record 458 comprises the message id of an enqueued message. The time field 454 of a work record 458 comprises a time that an action is to be performed on the enqueued message identified in the respective message id field 452. The action field 456 of a work record 458 comprises the action to be performed at the time identified in the respective time field 454 on the enqueued message identified in the respective message id field 452.

In an embodiment, the work item table 450 is indexed by both the time field 454 and the order in which the work records 458 are added to the work item table 450. A first work record 458 in the work item table 450 to be processed is the oldest work record 458 added to the work item table 450, i.e., the work record 458 highest in the work item table 450, with a time field value that is current or elapsed.

Figure 17:
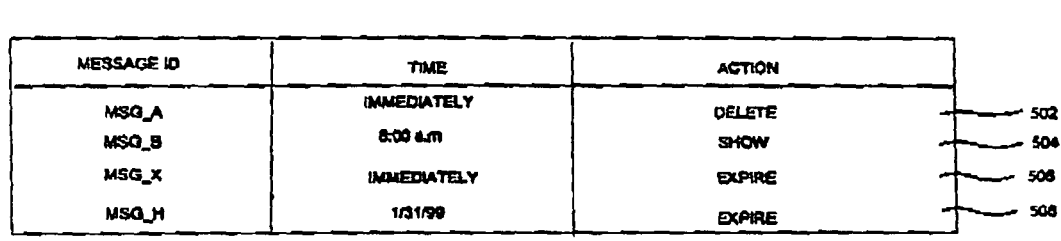
FIG. 17 depicts an illustrative example of an embodiment of a work item table.

An illustrative example of an embodiment of a work item table 500, shown in FIG. 17, has four work records 502, 504, 506 and 508. Work record 502 is the oldest work record added to the work item table 500, while work record 508 is the newest, or latest, work record. Assuming, for example, the current time is 8:05 a.m. on Jan. 1, 1999, in an embodiment, the first work record processed in the work item table 500 is work record 504, with a time field value of 8:00 a.m., i.e., an elapsed time field value. In an alternative embodiment, work record 502 is processed first, as its time field value is current, i.e., it reads IMMEDIATELY, and work record 502 is the oldest current or elapsed work record in the work item table 500.

In an embodiment, when a consumer reads, or more generally, accesses, a message in a message queue 10, a corresponding work record is generated for the work item table 500. The work record contains the message id of the message the consumer has just read, an indication of what action should be performed on the respective message, i.e., its message queue record is to be deleted, assuming, of course, that all other consumers that are to read the message have, and an indication of the time the action on the message's message queue record is to be performed, i.e., immediately. In work item table 500, work record 502 is an illustrative example of a work record generated by a consumer reading the MSG_A message. Work record 502 is an illustrative example of a work record used in garbage collection processing.

In an embodiment, a message is enqueued to the message queue at a first time, but the respective consumers that are to read it are only allowed to read it beginning at a second, later time. At the time the message is enqueued, a work record is generated for the work item table 500. The work record contains the message id of the enqueued message, an indication of what action is to be performed on the message, i.e., its message queue record is to be shown in the message queue to consumers at a specified time, and an indication of the time the action on the respective message queue record is to be performed, i.e., the time the message queue record is to be shown to consumers. In work item table 500, work record 504 is an illustrative example of a work record generated when the MSG_B message is enqueued to the message queue. Work record 504 indicates that the message queue record for the MSG_B message is to be shown to consumers, in order that they may read the MSG_B message, beginning at 8:00 a.m.

In an embodiment, it may be determined that an enqueued message is to be deleted from the message queue irrespective of whether all respective consumers have read it. A work record in the work item table 500 is generated to indicate that the message queue record for an identified message is to be deleted immediately, or at least as soon as the work item table 500 is next processed. The work record comprises the message id of the message whose message queue record is to be deleted, an indication of what action should be performed on the message, i.e., its message queue record is to be deleted, and an indication of the time the action on the message queue record is to be performed, i.e., immediately. In work item table 500, work record 506 is an illustrative example of a work record generated to indicate that the message queue record for the MSG_X message is to be immediately deleted from the message queue, whether or not all respective consumers have read it.

In an embodiment, it may be determined that an enqueued message is to be deleted from the message queue at a specified later time, irrespective of whether all respective consumers have read it. In an embodiment, a work record is created when the message is enqueued to the message queue, indicating that the message's message queue record is to be deleted from the message queue at a specified future time. In another embodiment, a work record is created sometime after a message is enqueued, indicating that the message's message queue record is to be deleted from the message queue at a specified future time.

In either embodiment, the generated work record comprises the message id of the message whose message queue record to be deleted, an indication of what action is to be performed on the message, i.e., its message queue record is to be deleted, and an indication of the time the action on the message queue record is to be performed, i.e., some future, specified time. In work item table 500, work record 508 is an illustrative example of a work record generated to indicate that the message queue record for the MSG_Y message is to be deleted from the message queue on a later date, Jan. 31, 1999, whether or not all respective consumers have read it.

While embodiments of various process flows are described herein, the reader is to understand that the combination and ordering of process actions and/or steps shown are by way of illustrative example, and not a limitation on the invention. The invention DS can be performed using different and/or additional process flow steps, and the steps may be performed in alternative orders, while still remaining within the spirit and scope of the invention.

System Architecture Overview

A computer system generally may take many forms, from a configuration including a variety of processing units, as further described herein, networked together to function as an integral entity, to a single computer or computing device, for example, but not limited to, e.g., a personal computer, operational in a stand-alone environment. The present invention can be embodied in any of these computer system configurations.

Figure 18A:
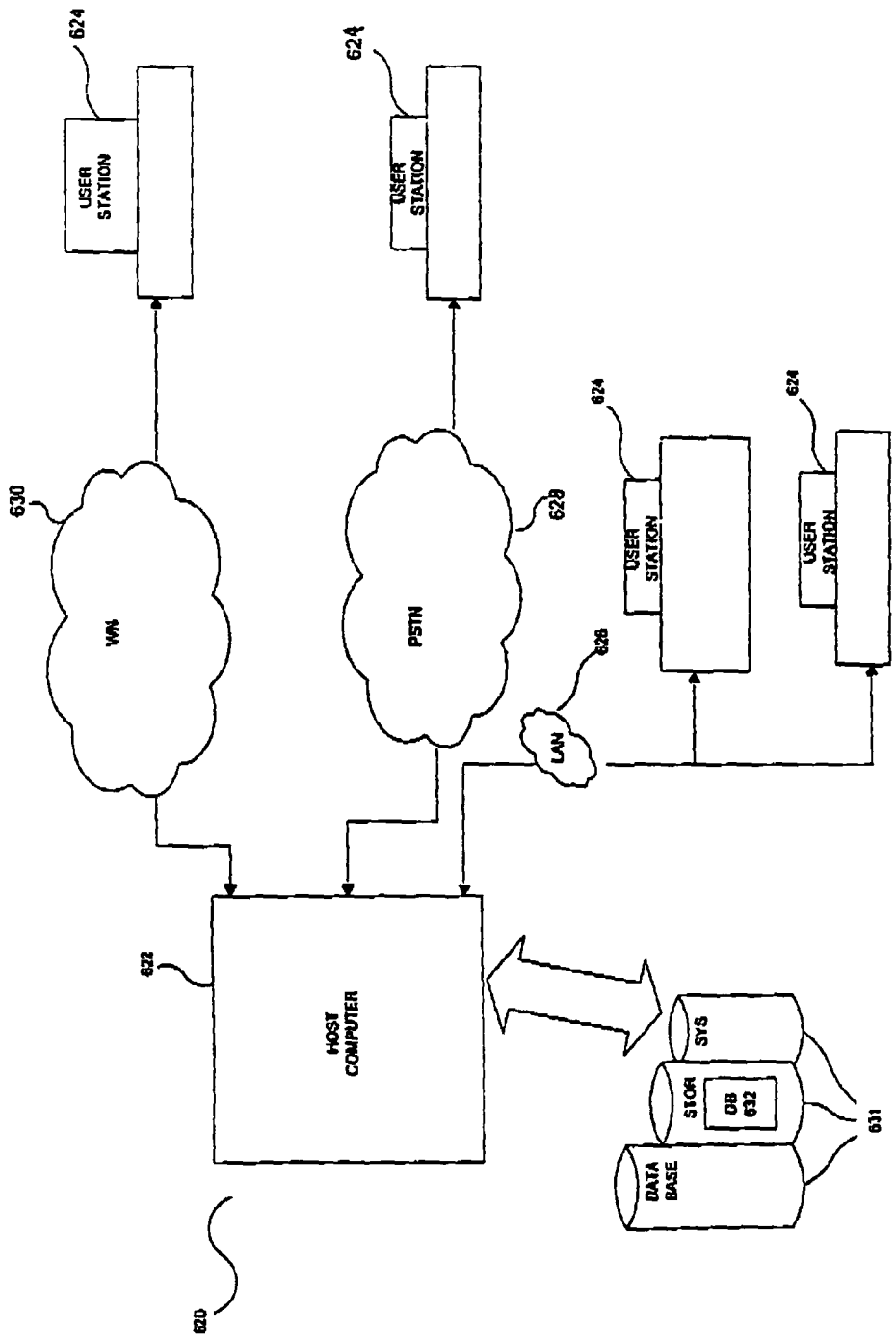
FIG. 18A is a simplified block diagram of an illustrative example of a computer system.

Referring to FIG. 18A, in an embodiment, a computer system 620 includes a host computer 622 connected to a plurality of individual user stations 624. In an embodiment, the user stations 624 each comprise suitable data terminals, for example, but not limited to, e.g., personal computers, portable laptop computers, or personal data assistants ("PDAs"), which can store and independently run one or more applications, i.e., programs. For purposes of illustration, some of the user stations 624 are connected to the host computer 622 via a local area network ("LAN") 626. Other user stations 624 are remotely connected to the host computer 622 via a public telephone switched network ("PSTN") 628 and/or a wireless network 630.

In an embodiment, the host computer 622 operates in conjunction with a data storage system 631, wherein the data storage system 631 contains a database 632 that is readily accessible by the host computer 622.

In alternative embodiments, the database 632 may be resident on the host computer, stored, e.g., in the host computer's ROM, PROM, EPROM, or any other memory chip, and/or its hard disk. In yet alternative embodiments, the database 632 may be read by the host computer 622 from one or more floppy disks, flexible disks, magnetic tapes, any other magnetic medium, CD-ROMs, any other optical medium, punchcards, papertape, or any other physical medium with patterns of holes, or any other medium from which a computer can read.

In an alternative embodiment, the host computer 622 can access two or more databases 632, stored in a variety of mediums, as previously discussed.

Figure 18B:
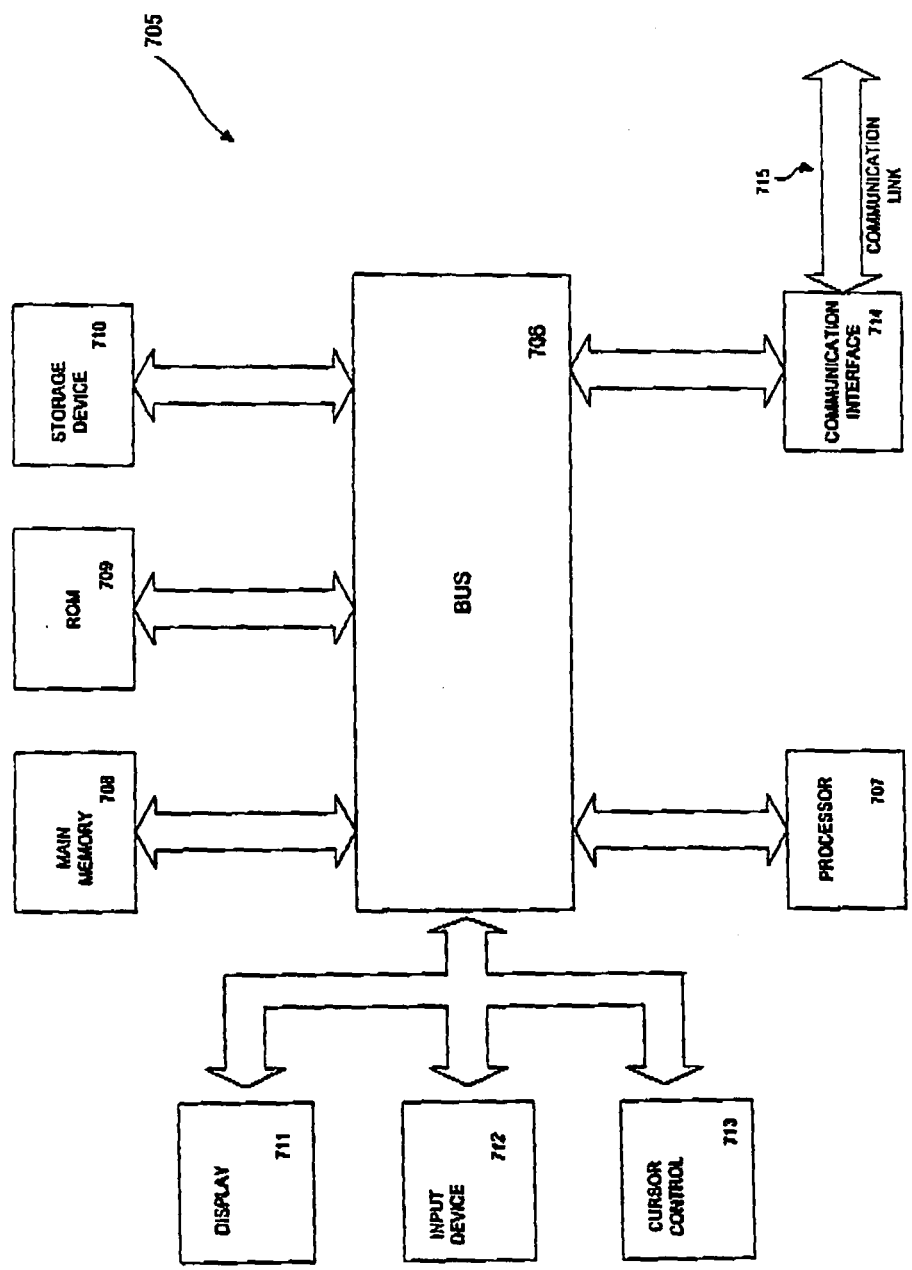
FIG. 18B is a simplified block diagram of an illustrative example of a user station and an illustrative example of a host computer of FIG. 18A.

Referring to FIG. 18B, in an embodiment, each user station 624 and the host computer 622, each referred to generally as a processing unit, embodies a general architecture 705. A processing unit includes a bus 706 or other communication mechanism for communicating instructions, messages and data, collectively, information, and one or more processors 707 coupled with the bus 706 for processing information. A processing unit also includes a main memory 708, such as a random access memory (RAM) or other dynamic storage device, coupled to the bus 706 for storing dynamic data and instructions to be executed by the processor(s) 707. The main memory 708 also may be used for storing temporary data, i.e., variables, or other intermediate information during execution of instructions by the processor(s) 707.

A processing unit may further include a read only memory (ROM) 709 or other static storage device coupled to the bus 706 for storing static data and instructions for the processor(s) 707. A storage device 710, such as a magnetic disk or optical disk, may also be provided and coupled to the bus 706 for storing data and instructions for the processor(s) 707.

A processing unit may be coupled via the bus 706 to a display device 711, such as, but not limited to, a cathode ray tube (CRT), for displaying information to a user. An input device 712, including alphanumeric and other keys, is coupled to the bus 706 for communicating information and command selections to the processor(s) 707. Another type of user input device may include a cursor control 713, such as, but not limited to, a mouse, a trackball, a fingerpad, or cursor direction keys, for communicating direction information and command selections to the processor(s) 707 and for controlling cursor movement on the display 711.

According to one embodiment of the invention, the individual processing units perform specific operations by their respective processor(s) 707 executing one or more sequences of one or more instructions contained in the main memory 708. Such instructions may be read into the main memory 708 from another computer-readable medium, such as the ROM 709 or the storage device 710. Execution of the sequences of instructions contained in the main memory 708 causes the processor(s) 707 to perform the process steps described herein. In alternative embodiments, hard-wired circuitry may be used in place of or in combination with software instructions to implement the invention. Thus, embodiments of the invention are not limited to any specific combination of hardware circuitry and/or software.

The term "computer-readable medium," as used herein, refers to any medium that provides information to the processor(s) 707. Such a medium may take many forms, including, but not limited to, non-volatile, volatile and transmission media. Non-volatile media, i.e., media that can retain information in the absence of power, includes the ROM 709. Volatile media, i.e., media that can not retain information in the absence of power, includes the main memory 708. Transmission media includes coaxial cables, copper wire and fiber optics, including the wires that comprise the bus 706. Transmission media can also take the form of carrier waves; i.e., electromagnetic waves that can be modulated, as in frequency, amplitude or phase, to transmit information signals. Additionally, transmission media can take the form of acoustic or light waves, such as those generated during radio wave and infrared data communications.

Common forms of computer-readable media include, for example: a floppy disk, flexible disk, hard disk, magnetic tape, any other magnetic medium, CD-ROM, any other optical medium, punchcards, papertape, any other physical medium with patterns of holes, RAM, ROM, PROM (i.e., programmable read only memory), EPROM (i.e., erasable programmable read only memory), including FLASH-EPROM, any other memory chip or cartridge, carrier waves, or any other medium from which a processor 707 can retrieve information.

Various forms of computer-readable media may be involved in providing one or more sequences of one or more instructions to the processor(s) 707 for execution. For example, the instructions may initially be provided on a magnetic disk of a remote computer (not shown). The remote computer may load the instructions into its dynamic memory and then transit them over a telephone line, using a modem. A modem local to the processing unit may receive the instructions on a telephone line and use an infrared transmitter to convert the instruction signals transmitted over the telephone line to corresponding infrared signals. An infrared detector (not shown) coupled to the bus 706 may receive the infrared signals and place the instructions therein on the bus 706. The bus 706 may carry the instructions to the main memory 708, from which the processor(s) 707 thereafter retrieves and executes the instructions. The instructions received by the main memory 708 may optionally be stored on the storage device 710, either before or after their execution by the processor(s) 707.

Each processing unit may also include a communication interface 714 coupled to the bus 706. The communication interface 714 provides two-way communication between the respective user stations 624 and the host computer 622. The communication interface 714 of a respective processing unit transmits and receives electrical, electromagnetic or optical signals that include data streams representing various types of information, including instructions, messages and data.

A communication link 715 links a respective user station 624 and a host computer 622. The communication link 715 may be a LAN 626, in which case the communication interface 714 may be a LAN card. Alternatively, the communication link 715 may be a PSTN 628, in which case the communication interface 714 may be an integrated services digital network (ISDN) card or a modem. Also, as a further alternative, the communication link 715 may be a wireless network 630.

A processing unit may transmit and receive messages, data, and instructions, including program, i.e., application, code, through its respective communication link 715 and communication interface 714. Received program code may be executed by the respective processor(s) 707 as it is received, and/or stored in the storage device 710, or other associated non-volatile media, for later execution. In this manner, a processing unit may receive messages, data and/or program code in the form of a carrier wave.

While preferred embodiments are disclosed herein, many variations are possible which remain within the spirit and scope of the invention. Such variations are clear after inspection of the specification, drawings and claims herein. The invention therefore is not to be restricted except by the scope and spirit of the appended claims.

What is claimed is:

1. A method for managing information produced by an application to be accessed by multiple consumers, said information comprising one or more information records, said information records to be accessed by said multiple consumers in a specified order, said information record comprising data produced by the application to be accessed by a consumer, said method comprising:

providing said data of an information record to a consumer of the multiple consumers;

updating, by using a processor, a history table, said history table comprising a history record for said consumer for said information record, said history record comprising a message state field for indicating whether said data of said information record have been provided to said consumer, said updating comprising setting said message state field in a history record corresponding to said consumer to indicate said consumer accessed said data, wherein the multiple consumers access the same information records in the same prescribed order and the consumer does not have to wait for any others to finish a transaction before the consumer begins the transaction on the same information records;

associating a work list table with said history table, said work list table comprising one or more work entries;

batching two or more work entries in said work list table;

reading one or more history records of said history table, said one or more history records determined by said two or more work entries;

deleting the one or more information records; and storing the data in a volatile or non-volatile computer-readable medium or displaying the data on a display device.

2. The method for managing information of claim 1, in which each said information record further comprises a message identifier value that identifies the data of said information record, and each said history record further comprises a message id field that identifies data in an information record.

3. The method for managing information of claim 2, in which each said history record further comprises a consumer id field that identifies a consumer of said multiple consumers that is to access data in an information record, said data identified by said message id field in said history record, said consumer id field of said history record identifying said history record as corresponding to said consumer.

4. The method for managing information of claim 3, in which said updating comprises setting said message state field in the history record with a message id field that identifies said data that said consumer is provided access to and with a consumer id field that identifies said consumer.

5. The method for managing information of claim 1, in which prefix index key compression is used to store only one instance of a message identifier value that identifies the data of an information record in said history table for each history record for said information record.

6. The method for managing information of claim 1, further comprising:

storing data to be accessed by a consumer in an information record;

creating a history record for each consumer that is to access said data; and setting said message state field in each said history record to indicate said data has not been accessed.

7. The method for managing information of claim 1, further comprising identifying the data of an information record that a consumer is to be provided access to by order data in a read-order table, said order data indicating a relative order that data in said information records is to be accessed by said multiple consumers.

8. The method for managing information of claim 1, further comprising:

reading one or more history records of said history table, said one or more history records comprising a history table read; and deleting an information record if all the message state fields in all of the history records of said history table read indicate that said data in said information record has been accessed.

9. The method for managing information of claim 1, wherein said work entry comprising an identification of data in the information record.

10. The method for managing information of claim 9, further comprising adding a work entry to said work list table, said work entry comprising an identification of said data said consumer is provided access to.

11. The method for managing information of claim 9, further comprising:

accessing a work entry in said work list table;

reading one or more history records of said history table, said one or more history records comprising a history table read, said one or more history records comprising said history table read determined by said work entry; and deleting an information record if all the message state fields in all of the history records of said history table read indicate that said data in said information record has been accessed.

12. A system for the delivery of information produced by an application to multiple consumers, said information comprising data produced by the application to be accessed by a consumer, said system comprising:

a processor for executing instructions;

an information queue comprising one or more information queue records, said information queue record comprising information to be accessed by one or more consumers; a table separated from said information queue, said table comprising one or more table records, said table record comprising an identification of said information in an information queue record, said table record further comprising a consumer identification field comprising an identification of one of said one or more consumers, and a message state field for indicating whether one of the one or more information queue records has been accessed by one of the one or more consumers, wherein the multiple consumers access the same information queue records in the same prescribed order and the one or more consumers do not have to wait for any others to finish a transaction before the one or more consumers begin the transaction on the same information queue records;

a work list table being associated with said table, said work list table comprising one or more work entries, wherein the processor is programmed for:

batching two or more work entries in said work list table;

reading one or more table records of said table, said one or more table records determined by said two or more work entries;

deleting the one or more information records; and a volatile or non-volatile computer-readable medium for storing the information or a display device displaying the information.

13. The system for the delivery of information to multiple consumers of claim 12, in which each said information queue record further comprises said identification of said information of said information queue record.

14. The system for the delivery of information to multiple consumers of claim 12, further comprising a read-order table, said read-order table comprising order data indicating the order that information in said information queue is to be delivered to a consumer.

15. The system for the delivery of information to multiple consumers of claim 14, in which said read-order table comprises one or more records, each said record of said read-order table comprising an identification field that identifies information in an information queue record, each said record of said read-order table further comprising an enqueue time field that comprises said order data.

16. The system for the delivery of information to multiple consumers of claim 12, wherein said work list entry comprising an identification of information in an information queue record.

17. The system for the delivery of information to multiple consumers of claim 16, in which each said work list entry is a record.

18. The system for the delivery of information to multiple consumers of claim 16, in which said work list table comprises one or more work records and each said work list entry is a field in a work record.

19. The system for delivery of information to multiple consumers of claim 12, in which for each of said one or more consumers, said table comprises a separate table record for each piece of information to be accessed by said consumer.

20. A system for the delivery of messages produced by an application to multiple consumers, said messages comprising data produced by the application to be accessed by a consumer, said method comprising, said system comprising:
   a processor for executing instructions;
   a message queue comprising one or more message queue records, said one or more message queue records comprising a message and a message identification;
   a history table separated from said message queue comprising
one or more history records, said one or more history records comprising
   a message identification, a consumer identification and a message state identification, said message state identification indicating whether one of the one or more message queue records has been accessed; and
   a work list table separated from said message queue and said history table comprising
one or more work list entries, said work list entry comprising a message identification, wherein the multiple consumers access the same message queue records in the same prescribed order and a consumer does not have to wait for any others to finish a transaction before the consumer begins the transaction on the same message queue records, wherein the processor is programmed for:
   batching two or more work entries in said work list table;
   reading one or more history records of said history table, said one or more history records determined by said two or more work entries;
   deleting the one or more information records; and
   a volatile or non-volatile computer-readable medium storing the message or a display device for displaying the message.

21. The system for the delivery of messages to multiple consumers of claim 20, further comprising a read-order table comprising one or more read-order records, each said read-order record comprising a message identification and order data, said order data indicating the relative order that the message of said message queue that is identified by the message identification of said read-order record is to be delivered to a consumer.

22. A method for multiple consumers to access information produced by an application in a non first-in first-out, prescribed order, said information comprising one or more pieces of information, a first piece of information produced by the application stored in a first location to be accessed by a consumer, said method comprising:
   providing access to said first piece of information to a first consumer of said multiple consumers;
   indicating in a second location in a history table that said first consumer has accessed said first piece of information, said history table having a first message state field for indicating whether said first consumer has accessed said first piece of information;
   providing access to said first piece of information to a second consumer of said multiple consumers;
   indicating, by using a processor, in a third location in said history table that said second consumer has accessed said first piece of information, said history table having a second message state field for indicating whether said second consumer has accessed said first piece of information, wherein the multiple consumers access the same information records in the same prescribed order and the first consumer does not have to wait for any others to finish a transaction before the consumer begins the transaction on the same information records;
   associating a work list table with said history table, said work list table comprising one or more work entries;
   reading one or more history records of said history table, said one or more history records determined by said two or more work entries;
   deleting said entry comprising said first piece of information from said queue of information after said first consumer and said second consumer have accessed said first piece of information, in which said first location comprises an information entry in a queue of information, in which said queue of information comprises one or more information entries, and each said information entry comprises a piece of information to be accessed by one or more of said multiple consumers, each said information entry further comprising an identification of said piece of information in said information entry; and
   storing the first piece of information in a volatile or non-volatile computer-readable medium or displaying the first piece of information on a display device.

23. The method for multiple consumers to access information of claim 22, in which said history table comprises an identification of said first piece of information and an identification of said first consumer.

24. The method for multiple consumers to access information of claim 23, in which said third location comprises a history entry in said history table, said history entry comprising an identification of said first piece of information and an identification of said second consumer.

25. The method for multiple consumers to access information of claim 22, further comprising:
   indicating in a fourth location an order in which said one or more pieces of information is to be accessed by said multiple consumers.

26. A computer program product that includes a volatile or non-volatile computer readable storage medium, the computer readable medium having stored thereon a sequence of instructions which, when executed by a processor, causes the processor to execute a process for multiple consumers to access information produced by an application in a non first-in first-out, prescribed order, said information comprising one or more pieces of information, a first piece of information produced by the application stored in a first location to be accessed by a consumer once, said process comprising:
   providing access to said first piece of information to a first consumer of said multiple consumers;
   indicating in a second location in a history table that said first consumer has accessed said first piece of information, said history table having a first message state field for indicating whether said first consumer has accessed said first piece of information;
   providing access to said first piece of information to a second consumer of said multiple consumers;
   indicating in a third location in said history table that said second consumer has accessed said first piece of information, said history table having a second message state field for indicating whether said second consumer has accessed said first piece of information, wherein the multiple consumers access the same information records in the same prescribed order and the first consumer does not have to wait for any others to finish a transaction before the first consumer begins the transaction on the same information records;

associating a work list table with said history table, said work list table comprising one or more work entries;

reading one or more history records of said history table, said one or more history records determined by said two or more work entries;

deleting said entry comprising said first piece of information from said queue of information after said first consumer and said second consumer have accessed said first piece of information, in which said first location comprises an information entry in a queue of information, in which said queue of information comprises one or more information entries, and at least one of said one or more information entries comprises a piece of information to be accessed by one or more of said multiple consumers, said at least one of said one or more information entries further comprising an identification of said piece of information in said information entry; and storing the first piece of information or displaying the first piece of information on a display device.

27. The computer program product of claim 26, in which said history table comprises an identification of said first piece of information and an identification of said first consumer.

28. The computer program product of claim 27, in which said third location comprises a history entry in said history table, said history entry comprising an identification of said first piece of information and an identification of said second consumer.

29. The computer program product of claim 26, further comprising:

indicating in a fourth location an order in which said one or more pieces of information is to be accessed by said multiple consumers.

30. A system for multiple consumers to access information produced by an application in a non first-in first-out, prescribed order, said information comprising one or more pieces of information, a first piece of information produced by the application stored in a first location to be accessed by a consumer, said system comprising:

a processor programmed for:

providing access to said first piece of information to a first consumer of said multiple consumers;

indicating in a second location in a history table that said first consumer has accessed said first piece of information, said history table having a first message state field for indicating whether said first consumer has accessed said first piece of information;

providing access to said first piece of information to a second consumer of said multiple consumers;

indicating in a third location in said history table that said second consumer has accessed said first piece of information, said history table having a second message state field for indicating whether said second consumer has accessed said first piece of information, wherein the multiple consumers access the same information records in the same prescribed order and the first consumer does not have to wait for any others to finish a transaction before the first consumer begins the transaction on the same information records;

associating a work list table with said history table, said work list table comprising one or more work entries;

reading one or more history records of said history table, said one or more history records determined by said two or more work entries;

deleting said entry comprising said first piece of information from said queue of information after said first consumer and said second consumer have accessed said first piece of information, in which said first location comprises an information entry in a queue of information, in which said queue of information comprises one or more information entries, said information entry comprises a piece of information to be accessed by one or more of said multiple consumers, said information entry further comprising an identification of said piece of information in said information entry; and a volatile or non-volatile computer-readable medium for storing the first piece of information or a display device for displaying the first piece of information.

31. The system of claim 30, in which history table comprises an identification of said first piece of information and an identification of said first consumer.

32. The system of claim 31, in which said third location comprises a history entry in said history table, said history entry comprising an identification of said first piece of information and an identification of said second consumer.

33. The system of claim 30, wherein the processor is further adapted for indicating in a fourth location an order in which said one or more pieces of information is to be accessed by said multiple consumers.

34. A computer program product that includes a non-transitory computer readable medium, the computer readable medium having stored thereon a sequence of instructions which, when executed by a processor, causes the processor to execute a process for managing information produced by an application to be accessed by multiple consumers, said information comprising one or more information records, said information records to be accessed by said multiple consumers in a specified order, said information record produced by the application comprising data to be accessed by a consumer, said process comprising:

providing said data of an information record to a consumer of the multiple consumers;

updating a history table, said history table comprising a history record for said consumer for said information record, said history record comprising a message state field for indicating whether said data of said information record have been provided to said consumer, said updating comprising setting said message state field in a history record corresponding to said consumer to indicate said consumer accessed said data, wherein the multiple consumers access the same information records in the same prescribed order and the consumer does not have to wait for any others to finish a transaction before the consumer begins the transaction on the same information records;

associating a work list table with said history table, said work list table comprising one or more work entries;

batching two or more work entries in said work list table;

reading one or more history records of said history table, said one or more history records determined by said two or more work entries;

deleting the one or more information records; and storing the data in a volatile or non-volatile computer-readable medium or displaying the data on a display device.

35. The computer program product of claim 34, in which each said information record further comprises a message identifier value that identifies the data of said information record, and each said history record further comprises a message id field that identifies data in an information record.

36. The computer program product of claim 34, in which prefix index key compression is used to store only one instance of a message identifier value that identifies the data of an information record in said history table for each history record for said information record.

37. The computer program product of claim 34, the process further comprising:
storing data to be accessed by a consumer in an information record;
creating a history record for each consumer that is to access said data; and
setting said message state field in each said history record to indicate said data has not been accessed.

38. The computer program product of claim 34, the process further comprising identifying the data of an information record that a consumer is to be provided access to by order data in a read-order table, said order data indicating a relative order that data in said information records is to be accessed by said multiple consumers.

39. The computer program product of claim 34, the process further comprising:
reading one or more history records of said history table, said one or more history records comprising a history table read; and
deleting an information record if all the message state fields in all of the history records of said history table read indicate that said data in said information record has been accessed.

40. The computer program product of claim 34, wherein said work entry comprising an identification of data in an information record.

* * * * *

UNITED STATES PATENT AND TRADEMARK OFFICE
CERTIFICATE OF CORRECTION

| | | |
|---|---|---|
| PATENT NO. | : 7,937,364 B1 | |
| APPLICATION NO. | : 09/265489 | |
| DATED | : May 3, 2011 | |
| INVENTOR(S) | : Chandrasekaran et al. | |

It is certified that error appears in the above-identified patent and that said Letters Patent is hereby corrected as shown below:

In column 7, line 60, delete "n is" and insert -- n's --, therefor.

In column 9, line 18-19, delete "Consumer B" and insert -- consumer B --, therefor.

In column 24, line 11, before "can" delete "DS".

In column 29, line 5, in Claim 19, after "for" insert -- the --.

In column 32, line 15, in Claim 31, after "which" insert -- said --.

Signed and Sealed this
Eighteenth Day of October, 2011

David J. Kappos
*Director of the United States Patent and Trademark Office*